(12) United States Patent
Dupuis et al.

(10) Patent No.: US 12,691,663 B2
(45) Date of Patent: Jul. 28, 2026

(54) GLASS ARTICLES HAVING ADHESIVE BEAD WITH CONTROLLED ANGLE AT GLASS-ADHESIVE INTERFACE AND ASSOCIATED METHODS

(71) Applicant: CORNING INCORPORATED, Corning, NY (US)

(72) Inventors: Antoine Dupuis, Champagne sur Seine (FR); Elias Merhy, Saulx-les-Chartreux (FR)

(73) Assignee: Corning Incorporated, Corning, NY (US)

( * ) Notice: Subject to any disclaimer, the term of this patent is extended or adjusted under 35 U.S.C. 154(b) by 31 days.

(21) Appl. No.: 18/880,377

(22) PCT Filed: Jun. 22, 2023

(86) PCT No.: PCT/US2023/025924
§ 371 (c)(1),
(2) Date: Dec. 31, 2024

(87) PCT Pub. No.: WO2024/010693
PCT Pub. Date: Jan. 11, 2024

(65) Prior Publication Data
US 2026/0014778 A1 Jan. 15, 2026

Related U.S. Application Data

(60) Provisional application No. 63/359,020, filed on Jul. 7, 2022.

(51) Int. Cl.
*B32B 1/00* (2024.01)
*B32B 7/14* (2006.01)
(Continued)

(52) U.S. Cl.
CPC .............. *B32B 17/061* (2013.01); *B32B 1/00* (2013.01); *B32B 7/14* (2013.01); *B32B 15/18* (2013.01);
(Continued)

(58) Field of Classification Search
None
See application file for complete search history.

(56) References Cited

U.S. PATENT DOCUMENTS 11,772,361 B2   10/2023   Hawtof et al.
2019/0012033 A1   1/2019   Brandao Salgado et al.
(Continued)

FOREIGN PATENT DOCUMENTS

WO   WO-2021158808 A1 *  8/2021   ....... B32B 17/10036
WO   WO-2021252430 A1 * 12/2021   ............... B32B 7/14

OTHER PUBLICATIONS

Dundurs, "Stress Intensity Factors in Two Bonded Elastic Layers Containing Crack Perpendicular on the Interface with Different Elastic Properties", Journal of Applied Mechanics, 1969, vol. 36, pp. 650-652.
(Continued)

*Primary Examiner* — Kim S. Horger
(74) *Attorney, Agent, or Firm* — Daniel J. Greenhalgh

(57) ABSTRACT

Described herein is a glass article comprising a support structure comprising a support surface, a glass substrate comprising a first major surface and a second major surface, and an adhesive bead disposed between the support surface and the second major surface. The adhesive bead comprises a plurality of outer surfaces extending between the support structure and the glass substrate, the plurality of outer surfaces extends at first angles relative to the second major surface at first edges thereof that are most proximate to the
(Continued)

glass substrate, and each of the first angles is greater than or equal to 35° and less than or equal to 60°.

22 Claims, 18 Drawing Sheets

(51) Int. Cl.
| | |
|---|---|
| *B32B 15/18* | (2006.01) |
| *B32B 15/20* | (2006.01) |
| *B32B 17/06* | (2006.01) |

(52) U.S. Cl.
CPC .......... *B32B 15/20* (2013.01); *B32B 2250/02* (2013.01); *B32B 2305/72* (2013.01); *B32B 2307/51* (2013.01); *B32B 2605/003* (2013.01)

(56) References Cited

U.S. PATENT DOCUMENTS

| | | |
|---|---|---|
| 2019/0315648 A1 | 10/2019 | Kumar et al. |
| 2019/0329531 A1 | 10/2019 | Brennan et al. |
| 2023/0212070 A1 | 7/2023 | Benjamin et al. |

OTHER PUBLICATIONS

Keikhaie et al; "Stress intensity factors in two bonded elastic layers containing crack perpendicular on the interface with different elastice properties"; Journal of Modern Physics, 2015, 6, pp. 640-647.
Suga et al., "Composite parameters and mechanical compatibility of material joints", Journal of Composite Materials, 1988, vol. 22, No. 10, pp. 917-934.
Xu et al., "Dissimilar Material Joints With and Without Free-edge Stress Singularities: Part I. A Biologically Inspired Design", 2004 Society for Experimental Mechanics, vol. 44, No. 6, Dec. 2004, pp. 608-615.

* cited by examiner

TO

FROM

FROM

GLASS ARTICLES HAVING ADHESIVE BEAD WITH CONTROLLED ANGLE AT GLASS-ADHESIVE INTERFACE AND ASSOCIATED METHODS

CROSS REFERENCE TO RELATED APPLICATIONS

This is a U.S. National Stage application under 35 U.S.C. § 371 of International Patent Application PCT/US2023/025924 filed on Jun. 22, 2023, which claims the benefit of priority under 35 U.S.C. § 119 of U.S. Provisional Application Ser. No. 63/359,020, filed on Jul. 7, 2022, the content of which is relied upon and incorporated herein by reference in its entirety.

TECHNICAL FIELD

The disclosure relates to glass articles for vehicle interior systems, in particular to a glass article having an adhesive bead forming an angle at glass-adhesive and frame-adhesive interfaces to reduce or even suppress stress singularity in the presence of various loads and consequently to improve the assembly strength.

BACKGROUND

Vehicle interiors may incorporate glass substrates as part of the aesthetic and functional design of the vehicle. Such glass substrates may be bonded to a frame system that attaches the glass surface to the vehicle interior. The glass substrate may be bonded through the frame system via a suitable adhesive. This adhesive may be subjected to stresses throughout the use lifetime of a vehicle interior. For example, the frame and glass substrate may be constructed of different materials having different thermal expansion properties, which may lead to stresses in the adhesive when temperature changes. In another example, the glass substrate may be cold-formed to conform with the shape of the frame, leading to persistent bending-induced stresses being present in the adhesive.

Given the presence of such stresses in vehicle interior components incorporating glass substrates, robust estimation of adhesive strength is needed. Certain existing designs incorporate adhesive bead structures leading to stress singularities at the glass-frame interface in various finite-element models that may be used to predict adhesive stresses. Such stress singularities render assessment of modeling results very difficult, potentially leading to unreliable designs prone to delamination over the use lifetime of the part.

Accordingly, an adhesive bead structure that aids in reducing such stress singularities is needed to enable more reliable part designs incorporating glass substrates.

SUMMARY

Accordingly, an adhesive bead structure that aids in reducing such stress singularities is needed to enable more reliable part designs incorporating glass substrates.

An aspect (1) of the present disclosure pertains to a glass article comprising a support structure comprising a support surface; a glass substrate comprising a first major surface and a second major surface, the second major surface being opposite to the first major surface; and an adhesive bead disposed between the support surface and the second major surface, wherein: the adhesive bead comprises a plurality of outer surfaces extending between the support structure and the glass substrate, the plurality of outer surfaces extends at first angles relative to the second major surface at first edges thereof that are most proximate to the glass substrate, and each of the first angles is greater than or equal to 35° and less than or equal to 60°.

An aspect (2) of the present disclosure pertains to a glass article according to the aspect (1), wherein the plurality of outer surfaces extends at second angles relative to the support surface at second edges thereof that are most proximate to the support structure.

An aspect (3) of the present disclosure pertains to a glass article according to the aspect (2), wherein the first angles equal the second angles for each of the plurality of outer surfaces.

An aspect (4) of the present disclosure pertains to a glass article according to any of the aspects (1)-(3), wherein each of the first angles is greater than or equal to 40° and less than or equal to 50°.

An aspect (5) of the present disclosure pertains to a glass article according to any of the aspects (1)-(4), wherein each of the first angles is greater than or equal to 42° and less than or equal to 48°.

An aspect (6) of the present disclosure pertains to a glass article according to any of the aspects (1)-(5), wherein each of the first angles is greater than or equal to 44° and less than or equal to 46°.

An aspect (7) of the present disclosure pertains to a glass article according to any of the aspects (1)-(6), wherein the support surface is curved and the adhesive bead maintains the glass substrate in a curved configuration on the support surface when the glass substrate is cold-formed.

An aspect (8) of the present disclosure pertains to a glass article according to the aspect (7), wherein: as a result of the glass substrate being cold-formed, the adhesive bead is maintained in a state of tensile stress, a position in the adhesive bead where the tensile stress comprises a maximum magnitude is displaced from an interface between the adhesive bead and the glass substrate and to the bulk of the adhesive bead.

An aspect (9) of the present disclosure pertains to a glass article according to any of the aspects (1)-(8), wherein the adhesive bead continuously extends around a perimeter of the glass substrate between the glass substrate and the support structure.

An aspect (10) of the present disclosure pertains to a glass article according to any of the aspects (1)-(8), wherein the glass article comprises a plurality of adhesive beads disposed along a bead path between the glass substrate and the support structure, each of the plurality of adhesive beads comprising a plurality of outer surfaces that extend at first angles relative to the second major surface that are greater than or equal to 35° and less than or equal to 60°.

An aspect (11) of the present disclosure pertains to a glass article according to any of the aspects (1)-(10), wherein the plurality of outer surfaces of the adhesive bead is concave such that the adhesive bead comprises a minimum cross-sectional dimension between the glass substrate and the support structure.

An aspect (12) of the present disclosure pertains to a glass article according to the aspect (11), wherein each of the plurality of outer surfaces of the adhesive bead is continuously curved an entirety of a distance between the glass substrate and the support structure.

An aspect (13) of the present disclosure pertains to a glass article according to any of the aspects (1)-(12), wherein the adhesive bead comprises an elastic modulus in the cured state of 0.1 MPa to 300 MPa.

An aspect (14) of the present disclosure pertains to a glass article comprising a support structure comprising a curved support surface that is curved at a radius of curvature that is greater than or equal to 75 mm and less than or equal to 10,000 mm; a glass substrate comprising a first major surface and a second major surface, the second major surface being opposite to the first major surface; and an adhesive bead disposed between the curved support surface and the second major surface and retaining the glass substrate in a curved shape on the curved support surface, wherein: the glass substrate is cold-formed such that a stress is present in the adhesive bead, the adhesive bead comprises a plurality of outer surfaces extending between the support structure and the glass substrate, the plurality of outer surfaces extends at first angles relative to the second major surface at first edges thereof that are most proximate to the glass substrate, and each of the first angles is greater than or equal to 35° and less than or equal to 60° such that a position in the adhesive bead where the stress is at a maximum value is displaced from an interface between the glass substrate and the adhesive bead.

An aspect (15) of the present disclosure pertains to a glass article according to the aspect (14), wherein the plurality of outer surfaces extends at second angles relative to the support surface at second edges thereof that are most proximate to the support structure.

An aspect (16) of the present disclosure pertains to a glass article according to the aspect (15), wherein the first angles equal the second angles for each of the plurality of outer surfaces.

An aspect (17) of the present disclosure pertains to a glass article according to any of the aspects (14)-(16), wherein each of the first angles is greater than or equal to 40° and less than or equal to 50°.

An aspect (18) of the present disclosure pertains to a glass article according to any of the aspects (14)-(17), wherein each of the first angles is greater than or equal to 44° and less than or equal to 46°.

An aspect (19) of the present disclosure pertains to a glass article according to any of the aspects (14)-(18), wherein the adhesive bead continuously extends around a perimeter of the glass substrate between the glass substrate and the support structure.

An aspect (20) of the present disclosure pertains to a glass article according to any of the aspects (14)-(18), wherein the glass article comprises a plurality of adhesive beads disposed along a bead path between the glass substrate and the support structure, each of the plurality of adhesive beads comprising a plurality of outer surfaces that extends at first angles relative to the second major surface that are greater than or equal to 35° and less than or equal to 60°.

An aspect (21) of the present disclosure pertains to a glass article according to any one of the aspects (14)-(20), wherein the plurality of outer surfaces of the adhesive bead is concave such that the adhesive bead comprises a minimum cross-sectional dimension between the glass substrate and the support structure.

An aspect (22) of the present disclosure pertains to a glass article according to any of the aspects (14)-(21), wherein: the adhesive bead comprises an elastic modulus in the cured state of 0.1 MPa to 300 MPa, and the support structure is constructed of one of aluminum and stainless steel.

An aspect (23) of the present disclosure pertains to a method of attaching a glass substrate to a support structure, the method comprising: dispensing an adhesive bead on one of the glass substrate and the support structure when adhesive of the adhesive bead is in an uncured state; contacting the adhesive bead with a plurality of shaping members to shape outer surfaces of the adhesive bead such that the outer surfaces of the adhesive bead extend at angles relative to the one of the glass substrate and the support structure at edges of the outer surfaces, the angles being greater than or equal to 35° and less than or equal to 60°; contacting the plurality of shaping members with the other of the glass substrate and the support structure such that, after shaping, the adhesive bead contacts both the support structure and the glass substrate; and curing the adhesive to solidify the adhesive bead such that the glass substrate and the support structure are bonded to one another via the adhesive bead.

An aspect (24) of the present disclosure pertains to a method according to the aspect (23), wherein the contacting the adhesive bead with the plurality of shaping members comprises moving the plurality of shaping members into contact with the adhesive bead after the adhesive bead is dispensed.

An aspect (25) of the present disclosure pertains to a method according to the aspect (24), wherein the plurality of shaping members are moved into contact with the adhesive bead via placement of the plurality of shaping members between the glass substrate and the support structure such that the shaping members are in contact with the glass substrate and the support structure.

An aspect (26) of the present disclosure pertains to a method according to the aspect (23), wherein the contacting the adhesive bead with the plurality of shaping members comprises dispensing the adhesive into an adhesive shaping cavity defined by a plurality of sacrificial shaping members disposed on the one of the glass substrate and the support structure.

An aspect (27) of the present disclosure pertains to a method according to the aspect (26), further comprising removing the plurality of sacrificial shaping members after the curing of the adhesive such that the adhesive bead retains a shape determined by the plurality of sacrificial shaping members.

An aspect (28) of the present disclosure pertains to a method according to the aspect (27), wherein the plurality of sacrificial shaping members is formed of a wax material and removing the plurality of sacrificial shaping members comprises heating the plurality of sacrificial shaping members to a temperature that is less than or equal to 70° C.

An aspect (29) of the present disclosure pertains to a method according to any of the aspects (23)-(28), further comprising cold-forming the glass substrate prior to deposition of the adhesive via application of a bending force to the glass substrate.

An aspect (30) of the present disclosure pertains to a method according to the aspect (29), wherein the adhesive is dispensed on the glass substrate after cold-forming and, after the adhesive is cured, the adhesive bead retains the glass substrate in a cold-formed state such that bending stresses are present in the adhesive bead.

An aspect (31) of the present disclosure pertains to a method according to any of the aspects (23)-(30), wherein the outer surfaces of the adhesive beads extend at angles relative to both the glass substrate and the support structure at edges thereof that are greater than or equal to 35° and less than or equal to 60° as a result of being contacted by the plurality of shaping members.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 7A-1 and 7A-2 depicts a plurality of images of a plurality of adhesive beads having edges extending at different angles relative to a glass substrate when simulated to be subjected to shear stresses, according to one or more embodiments of the present disclosure;

FIGS. 7B-1 and 7B-2 depicts a plurality of images of a plurality of adhesive beads having edges extending at different angles relative to a glass substrate when simulated to be subjected to tensile stresses, according to one or more embodiments of the present disclosure;

DETAILED DESCRIPTION

Figure 1:
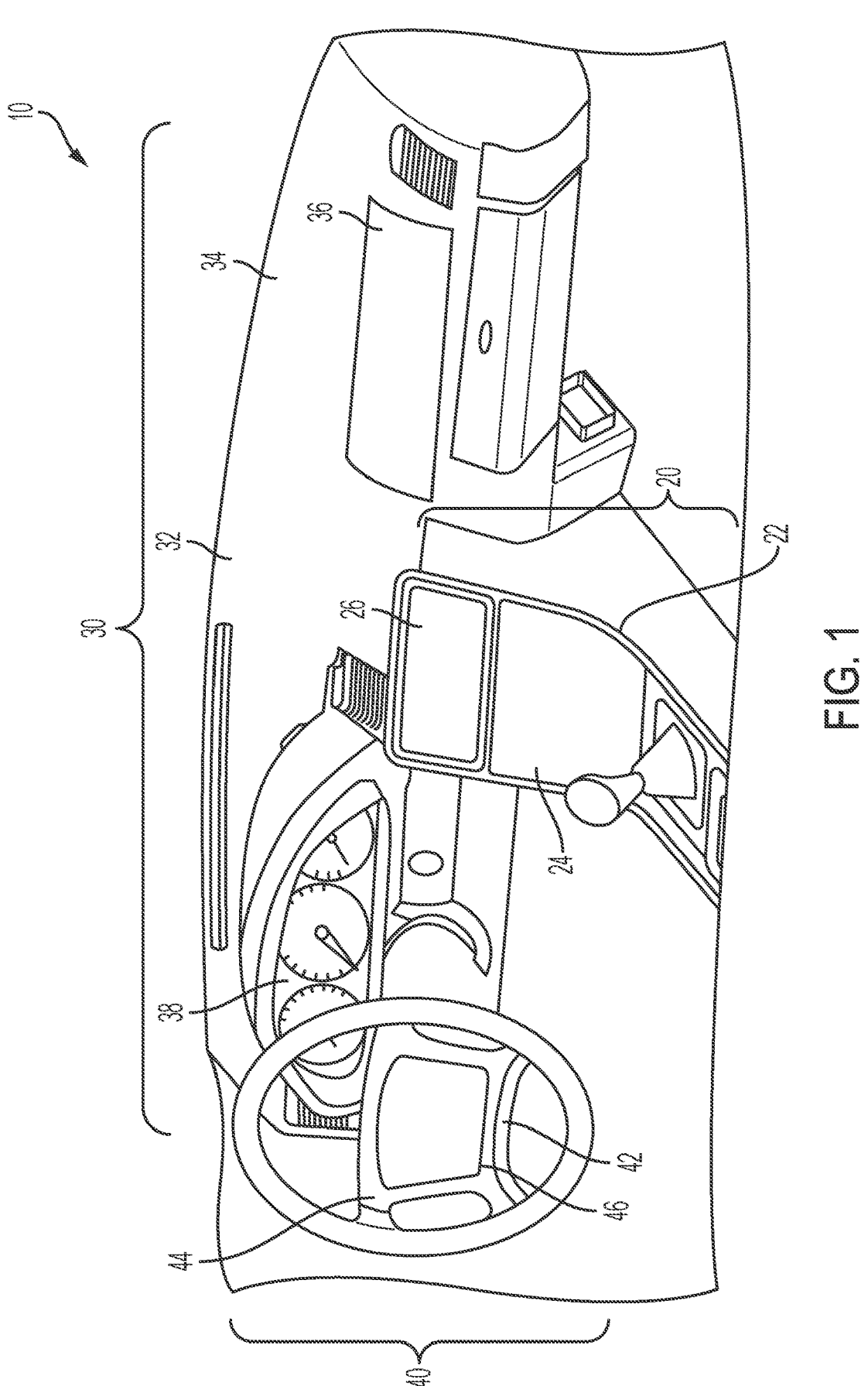
FIG. 1 is a perspective view of a vehicle interior having curved glass surfaces, according to one or more embodiments of the present disclosure.

Reference will now be made in detail to various embodiments, examples of which are illustrated in the accompanying drawings. Disclosed are glass articles comprising a support structure and a glass substrate connected to one another via an adhesive. The adhesive is formed in an adhesive bead having outer surfaces that extend between the glass substrate and the support structure. The outer surfaces extend at angles relative to surfaces of the glass substrate and support structure at the interfaces therebetween. The angles have been particularly selected to suppress physical stress singularities at the interfaces between the adhesive, the glass substrate, and the support structure. In embodiments, the angles at which the outer surfaces of the adhesive bead extend relative to glass substrate and support structure are greater than or equal to 35° and less than or equal to 60° (e.g., greater than or equal to 35° and less than or equal to 50°, greater than or equal to 36° and less than or equal to 50°, greater than or equal to 37° and less than or equal to 50°, greater than or equal to 38° and less than or equal to 50°, greater than or equal to 39° and less than or equal to 50°, greater than or equal to 40° and less than or equal to 50°, greater than or equal to 41° and less than or equal to 50°, greater than or equal to 42° and less than or equal to 50°, greater than or equal to 43° and less than or equal to 49°, greater than or equal to 42° and less than or equal to 48°, greater than or equal to 44° and less than or equal to 48, greater than or equal to 44° and less than or equal to 47°, greater than or equal to 44° and less than or equal to 46°, greater than or equal to 44.5° and less than or equal to 45.5°, approximately 45°). Such angles at the interfaces between the adhesive, the support structure and the glass substrate beneficially suppress physical stress singularities, which, as will become apparent herein, renders stress predictions less dependent on finite element analysis mesh-size, and thus more dependable. Moreover, such angles at the interfaces have been found to potentially reduce stress concentrations associated with various failure modes at the adhesive interfaces. As a result of the adhesive bead structures described herein, stress peaks are observed in the bulks of the adhesive, where they can be accurately predicted using finite element analysis. Maximum stresses associated with various failure modes (e.g., opening, siding) are also reduced by more than 15% as a result of the adhesive bead structures described herein. As such, the adhesive bead structure described herein enables the fabrication of more reliable glass parts using adhesive by lowering stresses and rendering such stresses more predictable.

Also disclosed are embodiments of a method for manufacturing a glass article having an adhesive bead structure with outer surfaces extending at angles in the above ranges relative to surfaces of a glass substrate and a support structure. The method includes disposing an adhesive bead having a desired volume of adhesive in an uncured state on one of the glass substrate and the support structure, and bringing the support structure and frame together such that the adhesive bead contacts the support structure and glass substrate. When the adhesive is in a deformable state (e.g., prior to the adhesive being completely cured), shaping members are brought into contact with the adhesive bead. The adhesive, being in a deformable state, conforms to the shape of the shaping members so as to form outer surfaces on the perimeter of the adhesive bead that extend at angles between 35° and 50° relative to surfaces of the support structure and glass substrate. In embodiments, the shaping members are moveable shims having convex surfaces that are brought into contact with the adhesive after the adhesive is dispensed and removed once the adhesive is able to maintain the shape imparted thereon by the shims. In embodiments, the shaping surfaces are surfaces of a sacrificial material (e.g., wax or other removable material) that are disposed on the one of the glass substrate and support structure prior to the dispensing of the adhesive. The sacrificial material may be removed after the adhesive is fully cured such that the adhesive obtains a shape imparted by the sacrificial material. Such methods are compatible with adhesives that are curable at room temperature. Adhesives cured at higher than room temperature may also be used with the sacrificial materials described herein, provided that the adhesive takes its final shape before melting the sacrificial material.

While the examples described herein pertain to applications where a glass substrate is coupled to a support structure with a suitable adhesive, the adhesive interface angles and associated methods described herein may be applied to any adhesive system where materials having different elastic properties (e.g., in terms of Young's modulus and Poisson's ratio) are attached to one another with an adhesive.

FIG. 1 shows an exemplary vehicle interior 10 of a vehicle that includes three different embodiments of vehicle interior systems 20, 30, 40. Vehicle interior system 20 includes a base, shown as center console base 22, with a curved surface 24 including a display 26. Vehicle interior system 30 includes a base, shown as dashboard base 32, with a curved surface 34 including a display 36. The dashboard base 32 typically includes an instrument panel 38 which may also include a display. Vehicle interior system 40 includes a base, shown as steering wheel base 42, with a curved surface 44 and a display 46. In one or more embodiments, the vehicle interior system includes a base that is an arm rest, a pillar, a seat back, a floor board, a headrest, a door panel, or any portion of the interior of a vehicle that includes a curved surface. In other embodiments, the base is a portion of a housing for a free-standing display (i.e., a display that is not permanently connected to a portion of the vehicle).

The embodiments of the curved glass articles described herein can be used in each of vehicle interior systems 20, 30, 40, among others. In some such embodiments, the glass article discussed herein may include a cover glass sheet that also covers non-display surfaces of the dashboard, center console, steering wheel, door panel, etc. In such embodiments, the glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass components with adjacent non-glass components. In specific embodiments, such ink or pigment coating may have a transparency level that provides for deadfront or color matching functionality when the display 26, 36, 46 is inactive. Further, while the vehicle interior of FIG. 1 depicts a vehicle in the form of an automobile (e.g., cars, trucks, buses and the like), the glass articles disclosed herein can be incorporated into other vehicles, such as trains, sea craft (boats, ships, submarines, and the like), and aircraft (e.g., drones, airplanes, jets, helicopters and the like).

In embodiments, the displays 26, 36, and 46 are flat and comprise cover glass with planar major surfaces. In embodiments, one or more of the displays 26, 36, and 46 are curved, and the curved display may include curved cover glass that may be hot-formed or cold-formed to possess such curvature. For example, such embodiments may incorporate the adhesive bead structure described herein of adhesive used to attach the curved cover glass to a curved frame or support structure. Such cold-forming may involve any of the techniques described in U.S. Pre-Grant Publication No. 2019/0329531 A1, entitled "Laminating thin strengthened glass to curved molded plastic surface for decorative and display cover application," U.S. Pre-Grant Publication No. 2019/0315648 A1, entitled "Cold-formed glass article and assembly process thereof," U.S. Pre-Grant Publication No. 2019/

0012033 A1, entitled "Vehicle interior systems having a curved cover glass and a display or touch panel and methods for forming the same," and U.S. patent application Ser. No. 17/214,124, entitled "Curved glass constructions and methods for forming same," which are hereby incorporated by reference in their entireties.

Figure 2A:
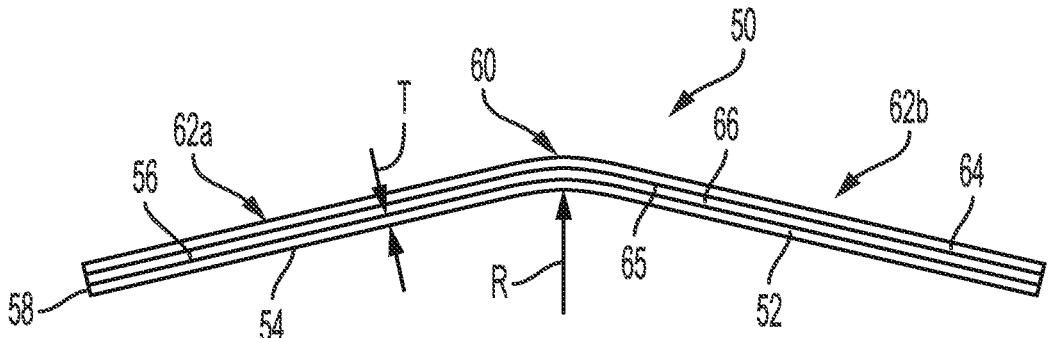
FIGS. 2A and 2B depict side views of embodiments of curved glass articles that may be used in the vehicle interior of FIG. 1, according to one or more embodiments of the present disclosure.
Figure 2B:
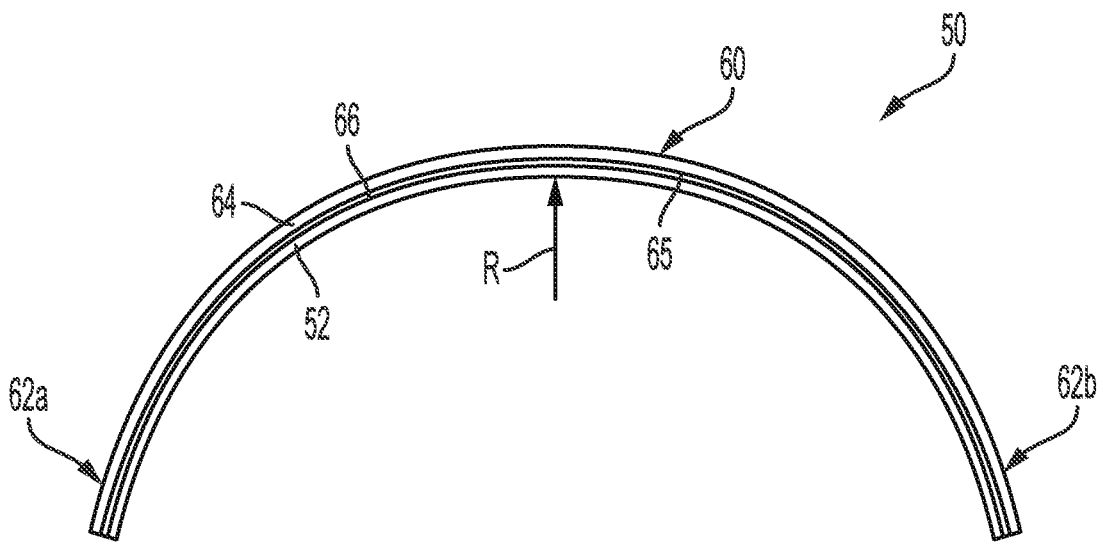

When incorporated into a curved display (such as in the displays 26, 36, and 46) the glass articles described herein may have a variety of different shapes. For example, FIGS. 2A and 2B depict side views of two implementations of a glass article 50. The glass article 50 may be a component of any of the displays 26, 36, and 46 depicted in FIG. 1, in addition to other glass articles. Referring first to FIG. 2A, a side view of an embodiment of the glass article 50 in a V-shaped configuration is shown. The glass article 50 includes a glass substrate 52 having a first major surface 54, a second major surface 56 opposite to the first major surface 54, and a minor surface 58 joining the first major surface 54 to the second major surface 56. The first major surface 54 and the second major surface 56 define a thickness T of the glass substrate 52. In embodiments, the thickness T of the glass substrate 52 is from 0.3 mm to 2 mm, in particular 0.5 mm to 1.1 mm. In a vehicle, the first major surface 54 faces the occupants of the vehicle.

In embodiments, the first major surface 54 and/or the second major surface 56 includes one or more surface treatments. Examples of surface treatments that may be applied to one or both of the first major surface 54 and second major surface 56 include an anti-glare coating, an anti-reflective coating, a coating providing touch functionality, a decorative (e.g., ink or pigment) coating, and an easy-to-clean coating.

As can be seen in FIG. 2A, the glass substrate 52 has a curved region 60 disposed between a first flat section 62a and a second flat section 62b. In embodiments, the curved region 60 has a radius of curvature R that is from 75 mm to a radius of curvature that is less than substantially flat or planar (e.g., R=10 m). In particular, the curved region 60 has a radius of curvature R that is from 150 mm to 3000 mm. Further, as shown in FIG. 2A, the curved region 60 defines a concave curve with respect to the first major surface 54, but in other embodiments, the curved region 60 is instead a convex curve with respect to the first major surface 54.

In the glass article 50 of FIG. 2A, a support structure 64 is adhered to the second major surface 56 of the glass substrate 52 using an adhesive bead 66. In embodiments, the adhesive bead 66 is a structural adhesive, such as a polyurethane adhesive. Other materials are also possible, such as an epoxy resin (e.g., 3M™ DP604NS, 3M™ DP125), a silane-modified polymer (e.g., Teroson™ MS 9399). In embodiments, the material of the adhesive bead 66 comprises an elastic modulus of from 0.1 MPa to 300 MPa. Further, in embodiments, the material of the adhesive bead 66 comprises a viscosity of 1 kcps to 500 kcps when disposed and prior to curing. In embodiments, the adhesive bead 66 comprises a thickness that is greater than or equal to 0.3 mm and less than or equal to 1.0 mm. In embodiments, the adhesive bead 66 comprises a width (in a direction parallel to the first and second major surfaces 54 and 56) that is greater than or equal to 1.5 mm and less than or equal to 2.0 mm. The width of the adhesive bead 66 may depend on a bezel width associated with the support structure 64. For example, the width may correspond to a bezel width of the support structure 64, which may extend from peripheral of the support structure 64 inward, and range from 1.0 mm to 15.0 mm.

In embodiments, the support structure 64 facilitates mounting the glass article 50 to a vehicle interior base (such as center console base 22, dashboard base 32, and/or steering wheelbase 42 as shown in FIG. 1). Additionally, the support structure 64 has a support surface 65 that may be curved and holds the glass substrate 52 in its curved shape (at least in the curved region 60). In embodiments, the glass substrate 52 is formed in such a way that the curved region 60 is not permanent. That is, the glass substrate 52 would spring back to a planar, non-curved configuration if the glass substrate 52 was not adhered to the support structure 64 using the adhesive bead 66. Thus, the glass substrate 52 is stressed to produce the curvature and remains stressed during the life of the glass article 50.

The stress in the glass substrate 52 tends to cause the glass substrate 52 to pull away from the support structure 64, which means that the adhesive bead 66 is also stressed. This stress can be further exacerbated by stresses caused by thermal cycling. In particular, the glass substrate 52 has a different coefficient of thermal expansion than that of the support structure 64, which is typically a metal, composite, or plastic component. The difference in coefficients of thermal expansion mean that the glass substrate 52 and frame expand or contract different amounts during thermal cycling between temperature extremes (e.g., as low as −40° C. and as high as 80° C.), causing additional stress in the adhesive bead 66. In order to avoid failure resulting from thermal stresses added to the normal mechanical stresses associated with bending, the adhesive bead 66 is provided with the shape described herein to suppress stress singularities at interfaces between the adhesive bead 66, the support structure 64, and the glass substrate 52. Such stress singularity suppression may render the stresses from bending and thermal cycling more predictable, thereby facilitating more reliable part design. Additionally, the adhesive bead shape described herein may lower peak stresses under tensile and sliding failure modes of the adhesive, rending failure (e.g., delamination) less likely over the lifetime of the glass article.

FIG. 2B depicts another embodiment of the glass article 50, when in a C-shaped glass configuration. As compared to the V-shaped configuration depicted in FIG. 2A, the C-shaped configuration of FIG. 2B has a larger curved region 60 and shorter flat sections 62a, 62b. The V-shape and C-shape are but two examples of glass articles 50 that can be created according to the present disclosure. In other embodiments, the glass articles 50 can include curved regions 60 having opposing curvatures to create an S-shape, a curved region 60 followed by a flat section 62a to create a J-shape, and curved regions 60 separated by a flat section 62a to create a U-shape, among others.

Figure 3:
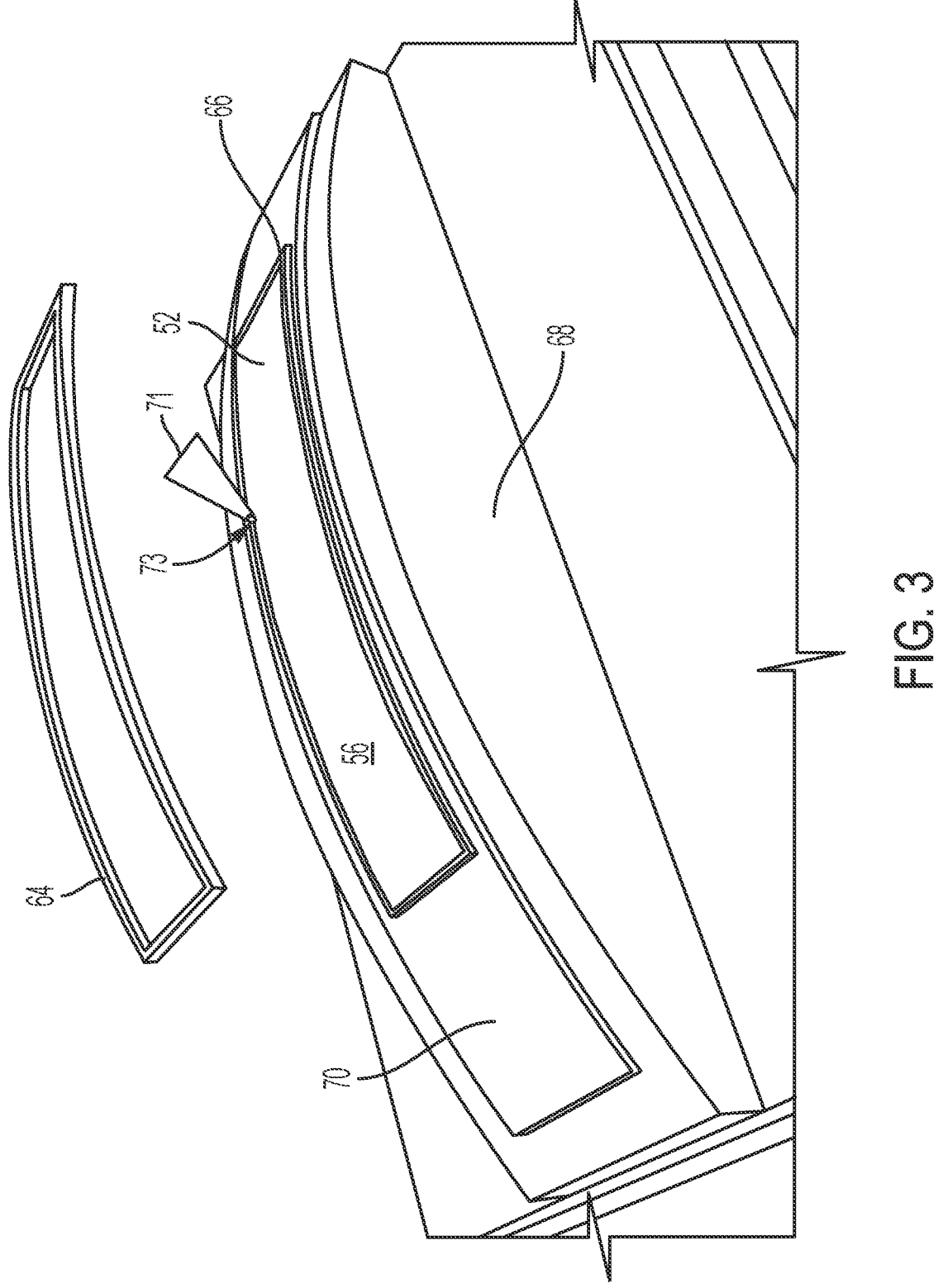
FIG. 3 depicts an embodiment of a cold-forming arrangement for producing glass articles, according to one or more embodiments of the present disclosure.

The glass articles 50 according to the present disclosure are formed by cold-forming techniques. In general, the process of cold-forming involves application of a bending force to the glass substrate 52, for example, while the glass substrate 52 is situated on a chuck 68 as shown in FIG. 3. As can be seen, the chuck 68 has a curved forming surface 70, and the glass substrate 52 is bent into conformity with the curved forming surface 70. Advantageously, it is easier to apply surface treatments to the glass substrate 52 when flat prior to creating the curvature in the glass substrate 52, and cold-forming allows the glass substrate 52 to be bent without destroying the surface treatment (as compared to the tendency of high temperatures associated with hot-forming techniques to destroy surface treatments, which requires surface treatments to be applied to the curved article in a more complicated process). In embodiments, the cold forming process is performed at a temperature less than the glass transition temperature of the glass substrate 52. In particular, the cold forming process may be performed at room temperature (e.g., about 20° C.) or a slightly elevated temperature, e.g., at 200° C. or less, 150° C. or less, 100° C. or less, or at 50° C. or less.

In embodiments, the bending force applied to the glass substrate 52 may be in the form of vacuum pressure pulled through the chuck 68. In embodiments, the chuck 68 includes interior channels having ports on the forming surface 70 of the chuck 68. When the glass substrate 52 is situated on the forming surface 70, vacuum is pulled through the channels to hold the glass substrate 52 against the chuck and into conformity with the curvature of the forming surface 70. In other embodiments, the forming surface 70 may hold the glass substrate 52 into compliance with the curvature using other techniques. For example, the forming surface 70 may be a self-adhesive material configured to provide sufficient adhesion to hold the glass substrate 52 in the curved configuration during cold forming, or the chuck 68 may operate in conjunction with a press or clamps that hold the glass substrate 52 into conformity with the forming surface 70 during cold-forming.

In the embodiment shown in FIG. 3, the adhesive bead 66 is applied to the second major surface 56 of the glass substrate 52, and the support structure 64 is lowered onto the glass substrate 52. However, in other embodiments, the adhesive bead 66 could instead be applied to the support surface 65 of the support structure 64. In either case, the support structure 64 may compress the adhesive bead 66 between the support surface 65 and the second major surface 56 of the glass substrate 52 such that the adhesive bead 66 contacts both the support surface 65 and the second major surface 56. As can be seen in FIG. 3, the adhesive bead 66 is being applied to the glass substrate 52 in such a manner that the shape traced by the adhesive bead 66, i.e., the "bead path," substantially matches the shape of the support structure 64. In embodiments, the adhesive bead 66 defines a closed bead path such that the adhesive bead 66 is continuous on the glass substrate 52. In other embodiments, the adhesive bead 66 may have a discontinuous bead path, e.g., have breaks between sections of adhesive bead 66.

In embodiments, the adhesive bead 66 is applied via a nozzle 71 having a circular port 73 as shown in FIG. 3. Advantageously, such nozzles allow for ease of manufacturing because the orientation of the nozzle relative to the glass substrate 52 is not limited in comparison to certain nozzles having, e.g., triangular shaped ports, which much be aligned in a specific orientation with respect to a glass sheet in order to apply a shaped adhesive bead in the proper position. Any suitable application technique may be used to apply the adhesive in an un-cured shape. Further, while FIG. 3 depicts the adhesive bead 66 being applied to the glass substrate 52 when the glass substrate 52 is in a curved configuration over the chuck 68, the adhesive bead 66 could instead be applied to the glass substrate 52 when the glass substrate 52 is in a flat configuration such that the glass substrate 52 having the adhesive bead 66 applied thereto is subsequently bent over the forming surface 70 of the chuck 68. Embodiments are also envisioned where the adhesive bead 66 is applied to the support structure 64 initially and then brought into contact with the glass substrate 52.

In the depicted embodiment, the adhesive bead 66, once cured, retains the glass substrate 52 in a curved configuration associated with the support structure 64. As such, the glass substrate 52 is maintained outside of mechanical equilibrium by the adhesive bead 66 and, as a result, the glass substrate

52 applies bending stresses to the adhesive bead 66. Additionally, the glass substrate 52 and the support structure 64 may be constructed of materials having substantially different coefficients of thermal expansion. As the glass article 50 is exposed to temperature variations, differential expansion and contraction of the glass substrate 52 and the support structure 64 may lead to additional thermally induced stresses in the adhesive bead 66. To determine whether the glass article 50 is likely to exhibit a longevity required for a particular application, such stresses should be modelled in advance of construction of the glass article 50 to determine whether, for example, an appropriate adhesive is selected for a particular design. While the preceding discussion pertained to embodiments where the glass substrate 52 is curved, the adhesive bead structure and associated methods described herein are also applicable to embodiments where the glass substrate 52 and support structure 64 (or at least the support surface 65) are flat.

Figure 4:
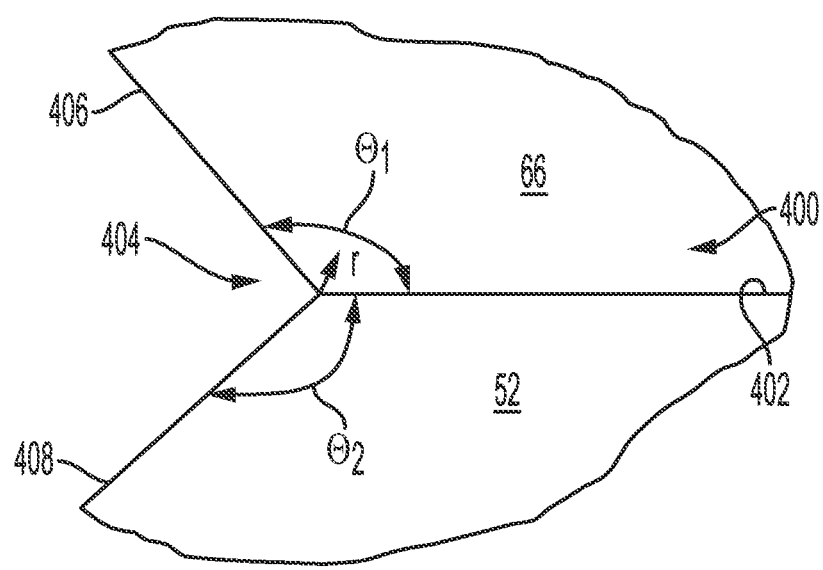
FIG. 4 schematically depicts a side view of a glass-adhesive interface, according to one or more embodiments of the present disclosure.

FIG. 4 depicts a cross-sectional view of a glass-adhesive interface 400. As shown, the glass-adhesive interface 400 is where the adhesive bead 66 described herein with respect to FIGS. 2A, 2B, and 3 contacts and bonds with the glass substrate 52. FIG. 4 depicts only a portion of the glass-adhesive interface 400 near an edge (e.g., a peripheral edge) thereof. As shown, at the edge 404 of the glass-adhesive interface 400, where the adhesive bead 66 terminates (e.g., the edge 404 may coincide with an end of an edge 406 of the adhesive bead 66), the adhesive bead 66 extends at an angle $\Theta_1$ relative to the contact area 402 where the adhesive bead 66 contacts the glass substrate 52. The edge 406 may correspond to an outer surface of the adhesive bead 66. At an edge 408 of the glass substrate 52, the glass substrate 52 extends at an angle $\Theta_2$ relative to the contact area 402. While FIG. 4 depicts a situation where the edges 406 and 408 of the glass substrate 52 and adhesive bead 66 coincide with one another, it should be understood that FIG. 4 only depicts regions of overlap between the adhesive bead 66 and the glass substrate 52. In the glass article 50 described herein with respect to FIGS. 2A, 2B, and 3, the edge of the adhesive bead 66 can be disposed inward of a peripheral edge (e.g., the minor surface 58, see FIG. 2A) of the glass substrate 52. Moreover, while the contact area 402 is depicted as flat, the contact area 402 may be curved in various embodiments, such as when the glass article 50 is curved and the glass substrate 52 is cold-formed, as described herein.

For wedge geometry and/or bi-material interfaces (as shown in FIG. 4), elastic continuum mechanics predicts infinite stress at the edge 404 and corners of each material (where the edges 406 and 408 contact one another at the end of the contact area 402). In this configuration, finite element models tend to exhibit a stress singularity, where calculated stress results at the edges 406 and 408 diverge from one another, dependent on the mesh size used in the finite element model. To illustrate, finite element analysis was conducted assuming a large gap between elastic moduli of the glass substrate 52 (Young's modulus of approximately 40,000 MPa) and support structure (Young's modulus of approximately 70,000 MPa (aluminum) or 200,000 MPa (stainless steel)) and the adhesive bead (Young's modulus of approximately 5 MPa), so that the glass substrate 52 and support structure 64 are considered to be rigid bodies in the analysis. The interfaces between the adhesive bead 66, the support structure 64, and the glass substrate 52 were assumed to be perfectly bonded, meaning that there is no relative displacement at the interface. The adhesive bead 66 was assumed to adopt a linear and isotropic behavior (with a Poisson's ratio of less than or equal to 0.5). The adhesive was assumed to have three degrees of freedom: (a) shear, where a shear load is applied in a direction parallel to the glass substrate 52 and support structure 64; (b) tension, where the adhesive bead 66 is stretched in a direction perpendicular to the glass substrate 52 and support structure 64; and (c) rotation, where the glass substrate 52 is twisted relative to the support structure 64. In the analysis, a coordinate system was attached to the support structure 64.

Figure 5A:
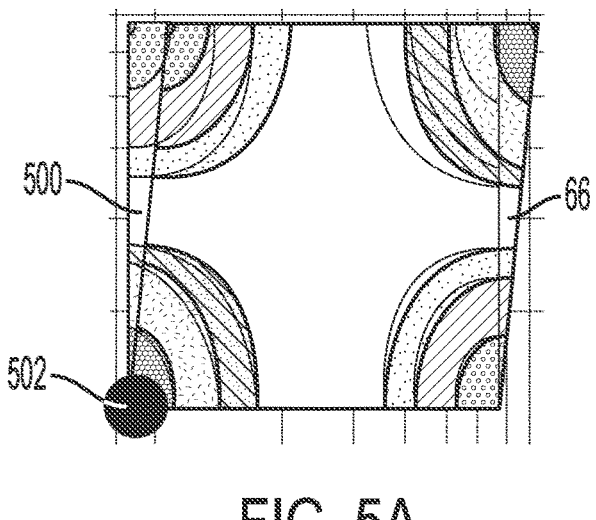
FIG. 5A depicts an adhesive bead having stresses thereon modelled using a finite element model, according to one or more embodiments of the present disclosure.
Figure 5B:
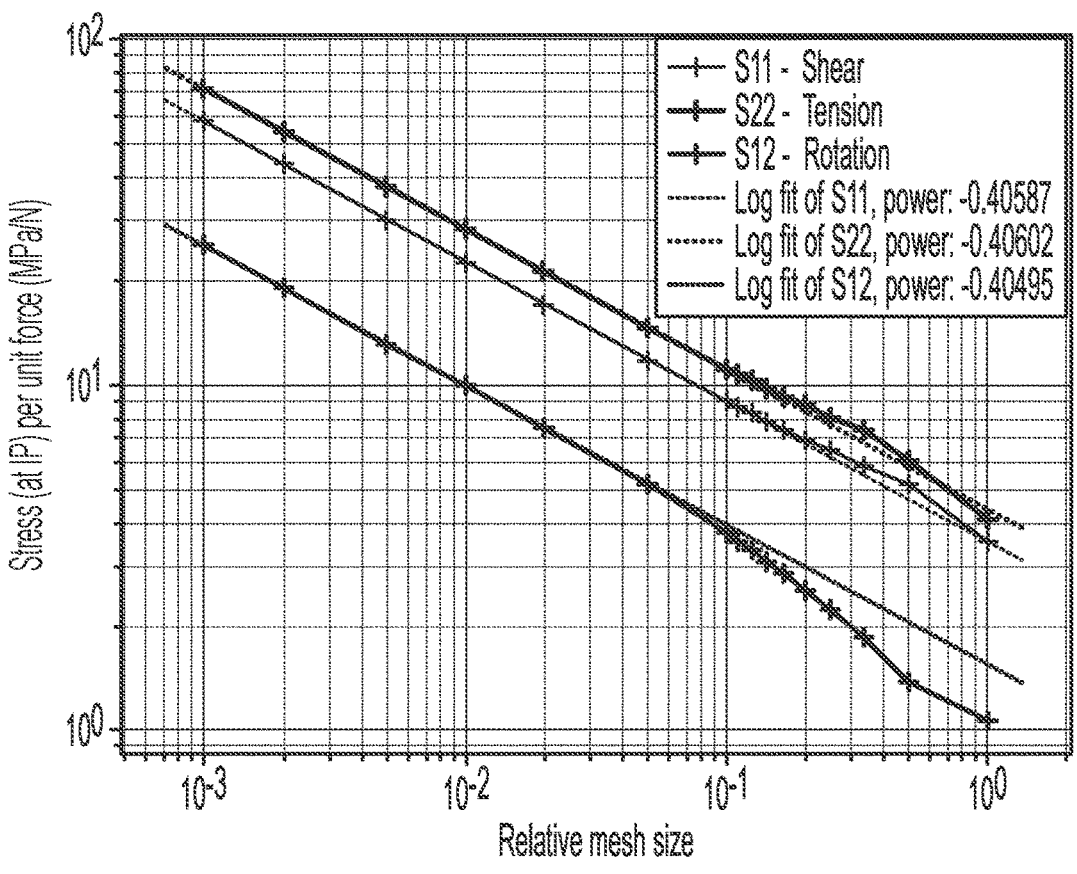
FIG. 5B is a graph plotting stresses at an integration point proximate to a corner of the adhesive bead depicted in FIG. 5A as a function of mesh size used in the finite element model, according to one or more embodiments of the present disclosure.

In the finite element analysis according to this example, the cross section of (in a direction perpendicular to the first and second major surfaces 54 and 56) the adhesive bead 66 was considered to be a unit square (1×1 mm² in a plane extending perpendicular to the glass substrate 52 and adhesive bead 66, assuming rigid top and bottom edges that correspond to the glass substrate 52 and the support substrate 64, with a unit force (tension and shear) or moment (rotation) being applied to the top edge of the adhesive bead 66 (corresponding to the glass-adhesive interface 400 depicted in FIG. 4). Several 2D models were generated, presenting a mesh size ranging from 1 to 10⁻3 mm. FIG. 5A depicts an example simulation result of the adhesive bead under a shearing load. The outline 500 depicts an initial shape of the adhesive bead 66 in this simulation. In this simulation, the first angle $\Theta_1$ (see FIG. 4) was assumed to be 90° (the edge 406 extended at 90° relative to the glass substrate 52 in the simulation). The simulation was focused on the integration point 502, representing the closest integration point to the corner of the adhesive bead 66 at the edge 406 (see FIG. 4). Results of the simulation are plotted in FIG. 5B. As shown, finer mesh sizes resulted in much higher estimated stress at the corner of the adhesive bead 66, varying by over an order magnitude over the mesh size range considered. Such phenomena, where predicted stress values for various loading conditions vary as a function of mesh size used, are described herein as "stress singularities."

With reference to FIG. 4, in the modeling of the glass-adhesive interface 400, the materials were modeled as elastic, isotropic, and homogenous. Fracture mechanics were used to evaluate crack propagation. Asymptotic solutions were used for a perfectly bonded dissimilar elastic plane subjected to traction and calculated near the vertex (the edge 404) of the bonded plane (corresponding to the contact area 402). These asymptotic solutions give the following relation between the singular stress field at free edges and the distance from the corner:

$$\sigma \sim K_a r^{\lambda-1} \tag{1}$$

where $K_a$ is the stress intensity factor and $\lambda$-1 is the order of the stress singularity. When the distance (signified by the vector r in FIG. 4) from the edge 404 is relatively small, subsequent terms for additional stress components are approximated to zero. According to Dundurs, J. *Stress Intensity Factors in Two Bonded Elastic Layers Containing Crack Perpendicular on the Interface with Different Elastic Properties*. Journal of Applied Mechanics, 1969, Vol. 36, p. 650-652, the material properties at the interface can be described in terms of two dimensionless materials mismatch parameters which are combinations of the four elastic constants for the materials at the interface:

$$\begin{cases} \alpha = \dfrac{\kappa(\chi_1 + 1) - (\chi_2 + 1)}{\kappa(\chi_1 + 1) + (\chi_2 + 1)} \\ \beta = \dfrac{\kappa(\chi_1 - 1) - (\chi_2 - 1)}{\kappa(\chi_1 + 1) + (\chi_2 + 1)} \end{cases}, \text{ with } \kappa = \dfrac{G_2}{G_1} \text{ and} \tag{2}$$

-continued
$$\begin{cases} \chi_i = \dfrac{3 - v_i}{1 + v_i}, \text{ for plane stress} \\ \chi_i = 3 - 4v_i, \text{ for plane strain} \end{cases}$$

where $G_i$ and $v_i$ are the shear modulus and Poisson's ratio for the material i at the interface. The parameter $\alpha$ is a measure of the relative stiffness of the materials in contact.

According to Suga, T., Elssner, G., et Schmauder, S. *Composite parameters and mechanical compatibility of material joints*. Journal of Composite Materials, 1988, vol. 22, no 10, p. 917-934, the order of the stress singularity $\lambda$-1 is defined and can be determined from the characteristic equation:

$$\det(\lambda) = D_2(\lambda).\overline{D_2(\lambda)} - D_1(\lambda).\overline{D_1(\lambda)} = 0 \tag{3}$$

where $$\tag{4}$$
$$\begin{cases} D_1(\lambda) = -\lambda^2(\alpha - \beta)\overline{A(1)}B(1) + (\alpha - 1)A(\lambda) - \\ \qquad (\alpha - \beta)A(\lambda)B(\lambda) + (\alpha + 1)B(\lambda) \\ D_2(\lambda) = \lambda\big((\alpha - 1)A(1) - (\alpha - \beta)\big(A(1)B(\lambda) + \overline{A(\lambda)}B(1)\big) + (\alpha + 1)B(1)\big) \end{cases}$$

$$\begin{cases} A(\lambda) = 1 - \exp(2i\lambda\theta_1) \\ B(\lambda) = 1 - \exp(2i\lambda\theta_2) \end{cases}. \tag{5}$$

Figure 6A:
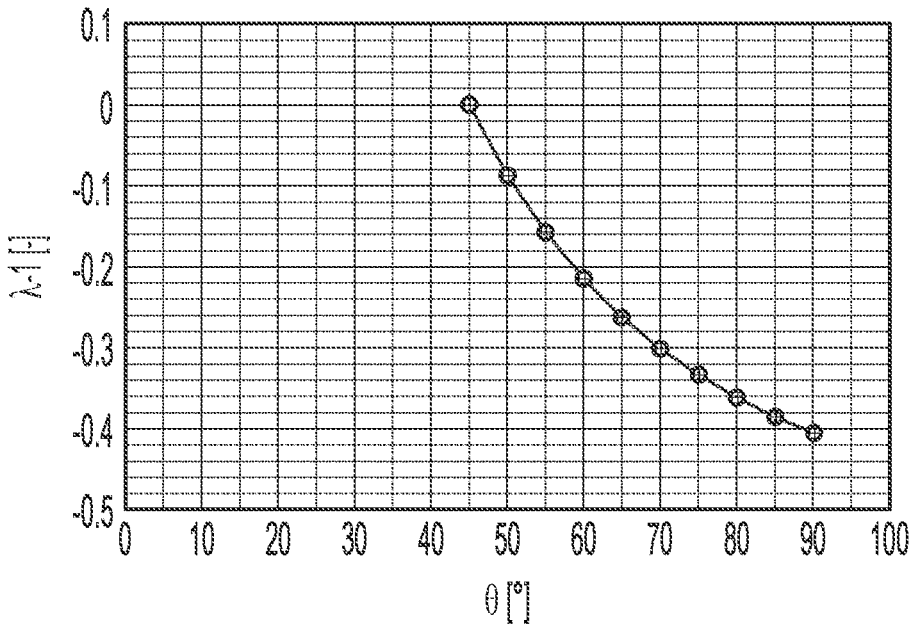
FIG. 6A is a graph plotting an order of a stress singularity at a corner of an adhesive bead as a function of an angle an outside surface of the adhesive extends relative to glass at a glass-adhesive interface, predicted using an analytical computational approach, according to one or more embodiments of the present disclosure.

As indicated by Equations 2-5, the order of the stress singular $\lambda$-1 is dependent on the material properties of the glass and adhesive, as well as the angles $\Theta_1$ and $\Theta_2$ that the glass and adhesive extend relative to one another at the glass-adhesive. Analytical computations were conducted for various glass-adhesive interface designs depending on the angle $\Theta_1$ of the adhesive at the interface with the glass (when holding material properties constant). In these examples the edge 406 of the adhesive bead 66 was assumed to be a concave surface, so the angle $\Theta_1$ was less than 90°. The results are depicted in FIG. 6A. As shown, over the range considered, the order of the stress singularity decreases with decreasing angle of the adhesive at the interface. With $\Theta_1$ being 45°, the order of the singularity is zero. Such a 45° angle will generally provide such a result so long as the moduli of the glass substrate 52 and support structure 64 are an order of magnitude greater than the moduli of the adhesive bead 66. Such results facilitate improved part design by enabling proper stress estimation. Accordingly, in embodiments, the angle $\Theta_1$ is greater than or equal to 35° and less than or equal to 70° (e.g., greater than or equal to 35° and less than or equal to 60°, greater than or equal to 35° and less than or equal to 55°, greater than or equal to 35° and less than or equal to 50°, greater than or equal to 36° and less than or equal to 50°, greater than or equal to 37° and less than or equal to 50°, greater than or equal to 38° and less than or equal to 50°, greater than or equal to 39° and less than or equal to 50°, greater than or equal to 40° and less than or equal to 50°, greater than or equal to 41° and less than or equal to 50°, greater than or equal to 42° and less than or equal to 50°, greater than or equal to 43° and less than or equal to 50°, greater than or equal to 42° and less than or equal to 49°, greater than or equal to 42° and less than or equal to 48°, greater than or equal to 44° and less than or equal to 48, greater than or equal to 44° and less than or equal to 47°, greater than or equal to 44° and less than or equal to 46°, greater than or equal to 44.5° and less than or equal to 45.5°, approximately 45°). In embodiments, the adhesive bead 66 and glass substrate 52 are formed so that the order $\lambda$-1 of the stress singularities computed by Equations 2-5 herein at the glass-adhesive interface has a magnitude of less than or equal to 0.3 (less than or equal to 0.25, less than or equal to 0.20, less than or equal to 0.15, less than or equal to 0.1, less than or equal to 0.5).

While only the glass-adhesive interface 400 is depicted in FIG. 4, it should be understood that the values for $\Theta_1$ provided herein may apply not only to the angle that the outer surfaces of the adhesive extend relative to the glass substrate at the interface between the glass and the adhesive (e.g., at an end of the adhesive bead 66), but also to the angle that the outer surfaces of the adhesive extend relative to the support structure at the interface between the glass and the support structure. That is, the values for $\Theta_1$ described herein correspond to the angles at which the adhesive extends relative to another material with different elastic properties (in terms of Young's modulus) at the corner of the adhesive bead (the "corner" representing an intersection between an outer surface of the adhesive bead and an end surface of the adhesive bead that is bonded with the other material). The angles at the corners of the adhesive bead 66 may match one another in some embodiments, such that the adhesive bead 66 comprises a symmetrical shape. In other embodiments, the corner angle of the adhesive bead at a first interface (the glass-adhesive interface) may not match the corner angle of the adhesive bead at a second interface (the interface between the adhesive bead 66 and the support structure 64), but both corner angles my lie within any of the ranges provided for $\Theta_1$ herein.

Figure 6B:
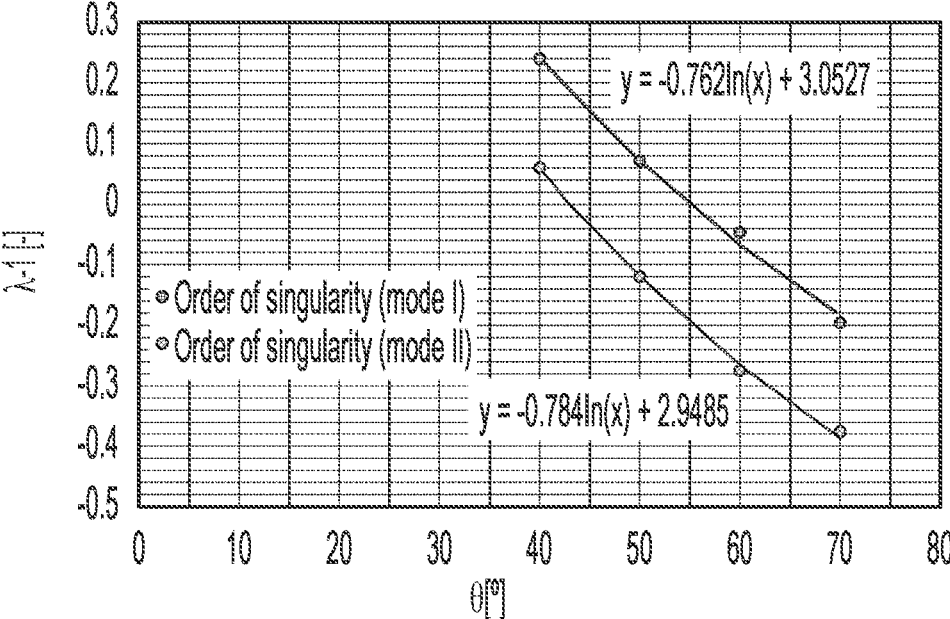
FIG. 6B is a graph plotting an order of a stress singularity at a corner of an adhesive bead as a function of an angle an outside surface of the adhesive extends relative to glass at a glass-adhesive interface, predicted using a finite element model, for both opening (mode I) and sliding (mode II) failure modes, according to one or more embodiments of the present disclosure.

A two-dimensional finite element analysis for various loading modes was also conducted to determine the order of the singularity as a function of the angle $\Theta_1$ for a shear loading case. The results are depicted in FIG. 6B for two failure modes. Mode I represented interface detachment, while mode II represented interface sliding. As shown, the angle $\Theta_1$ being in a range from 40° to 50° in this case resulted in the lowest magnitude stress singularity, with an angle of about 42° providing no stress singularity for the interfacial sliding mode and an angle of about 48° providing no stress singularity for the interface detachment mode. In embodiments, the angle $\Theta_1$ may be in a range from 42° to 48° to minimize the singularity for both failure modes in the shearing load case.

Figures 1, 2, 7A:
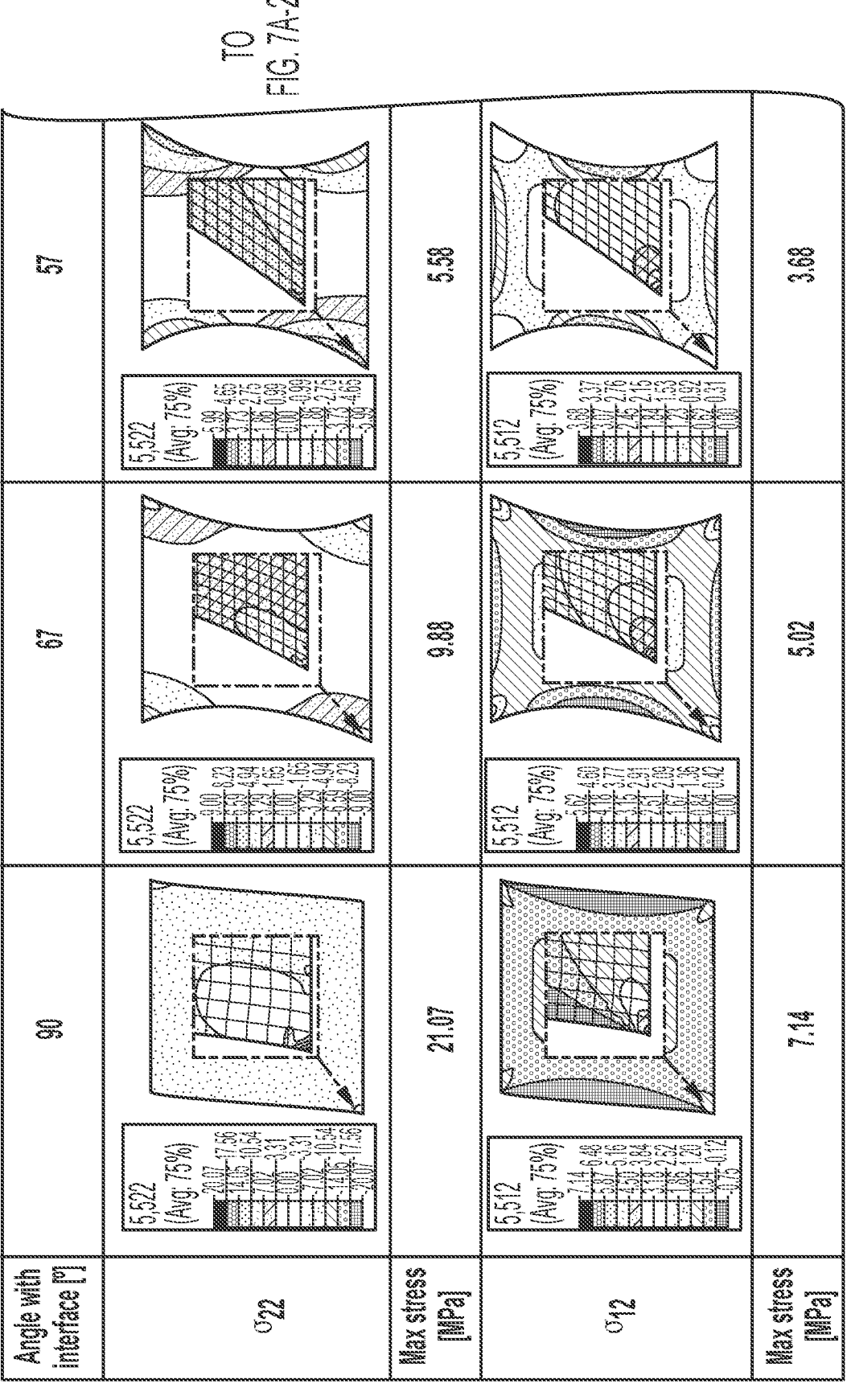
Figures 1, 2, 7A:
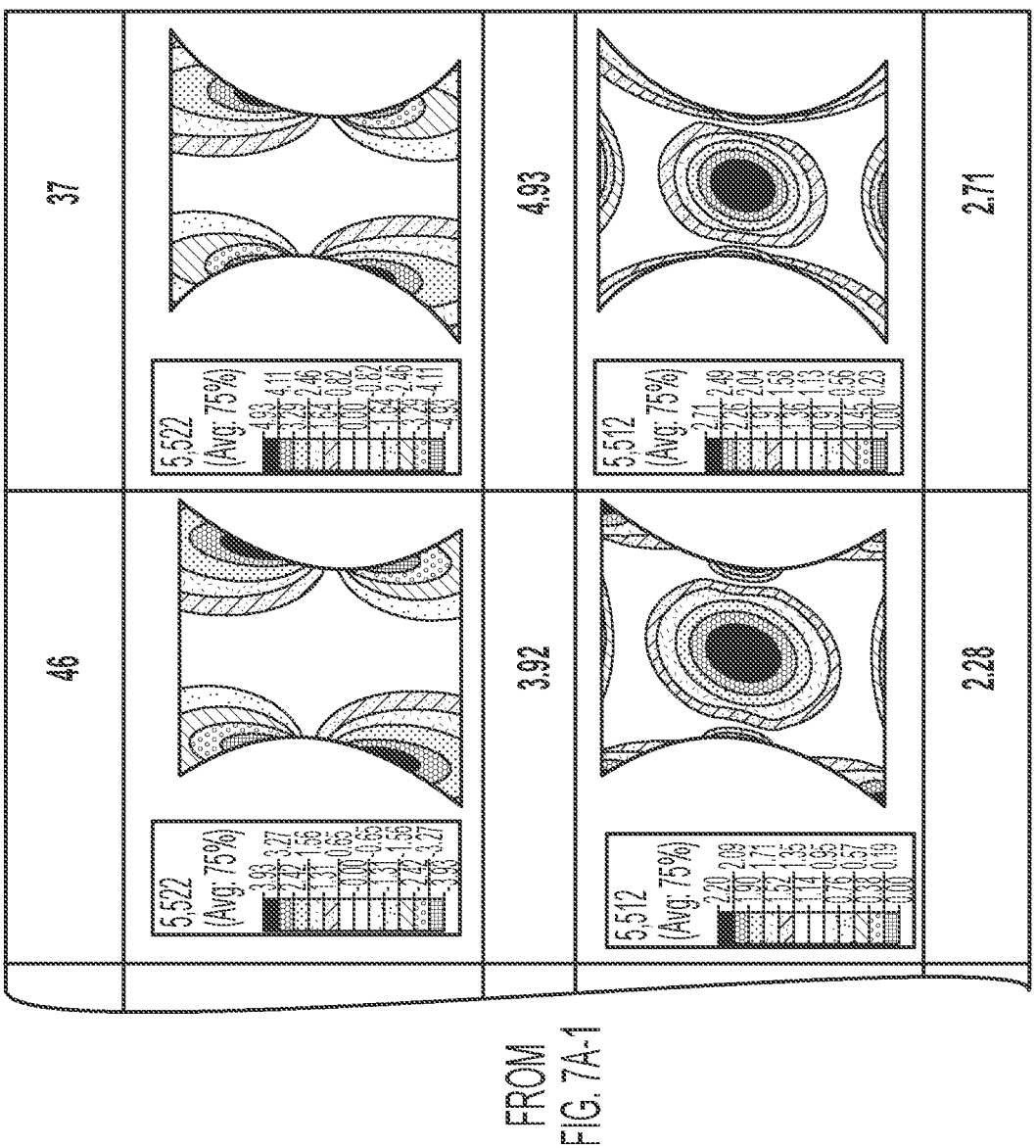
Figures 1, 7B:
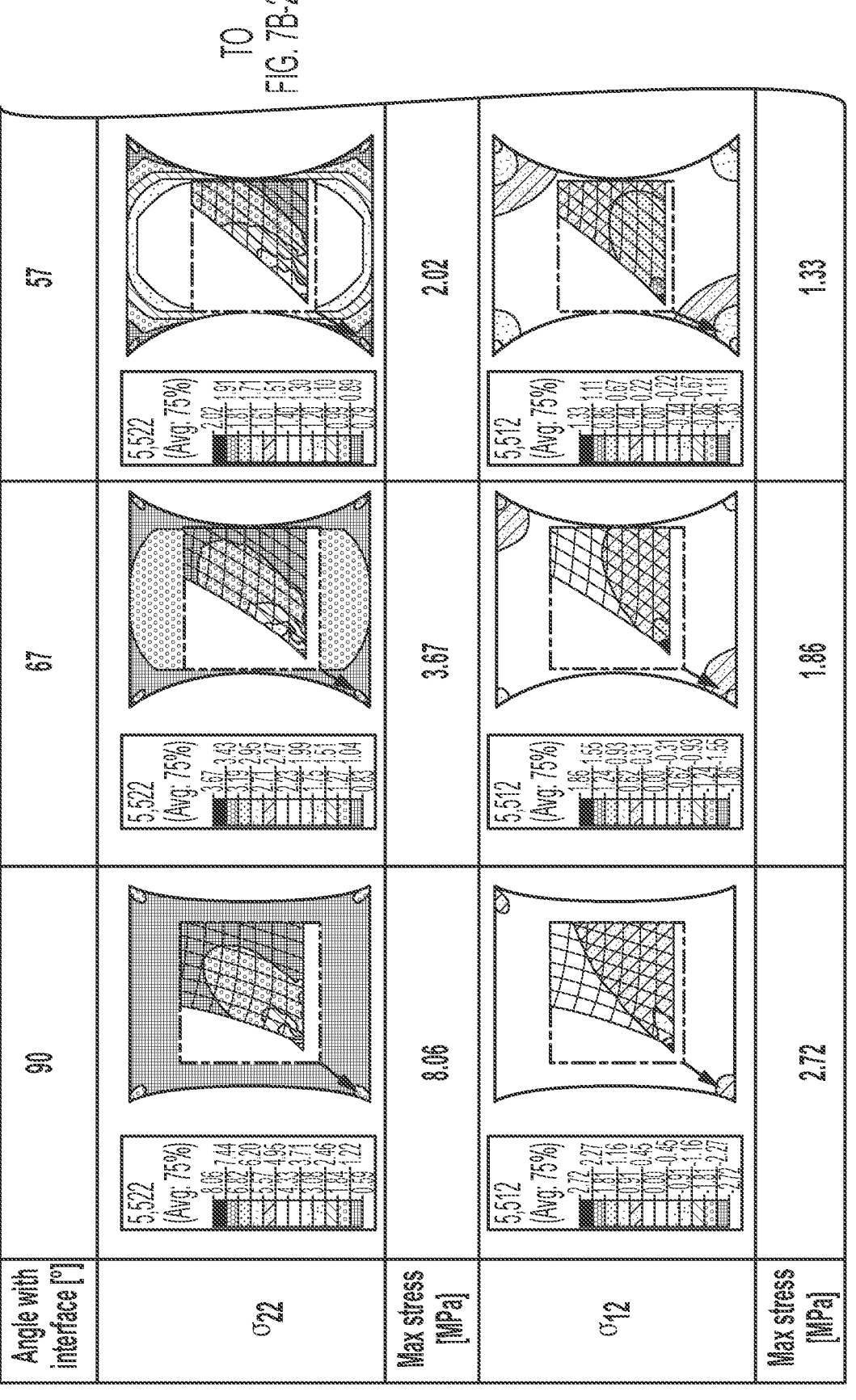
Figures 1, 2, 7B:
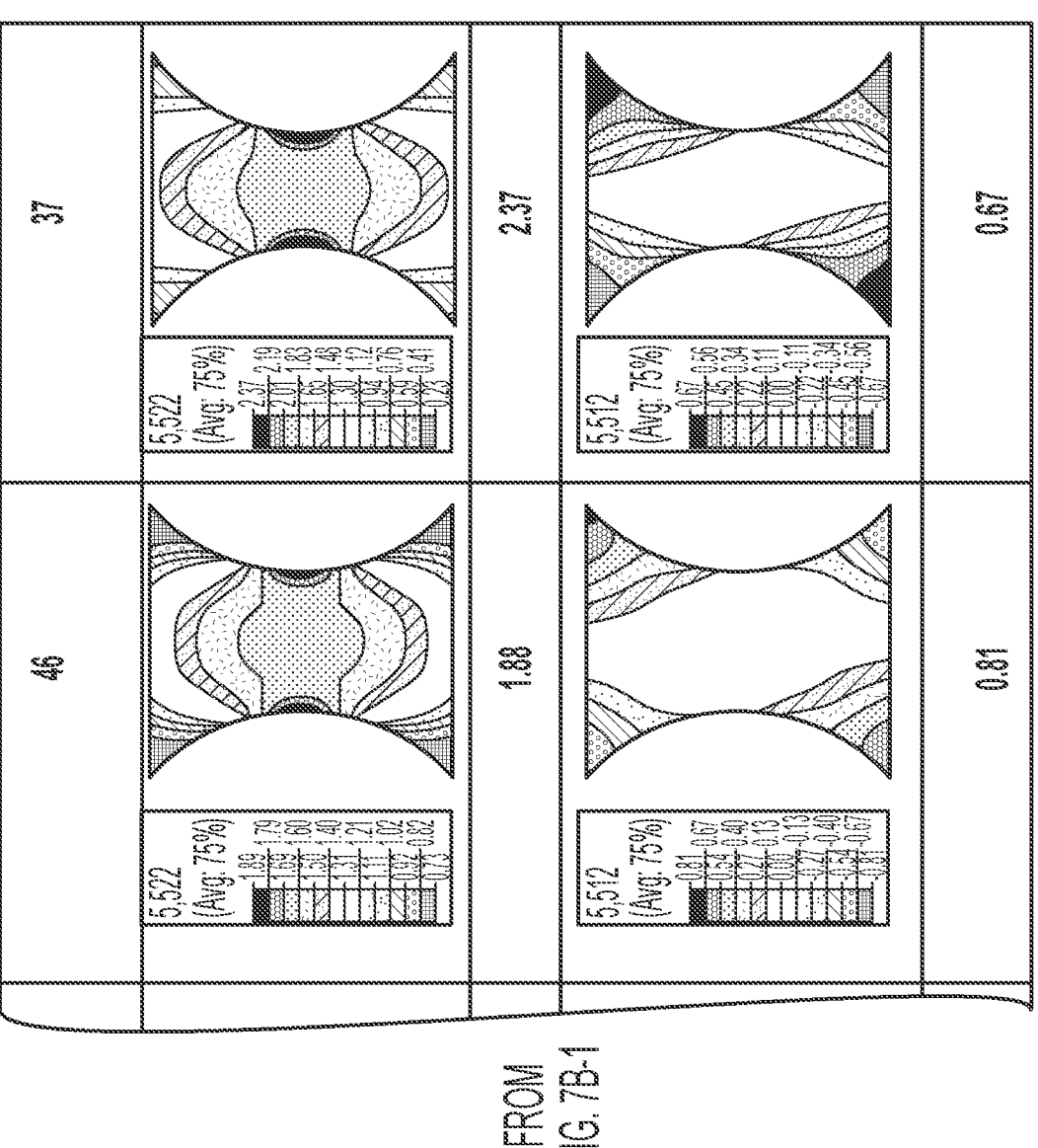

To identify a relation between the adhesive angle at the interface ($\Theta_1$ depicted in FIG. 4) and the stress singularity, different sections of adhesive were simulated using a finite element model. Values for $\Theta_1$ of 90° (corresponding to a case where the edge 406 of the adhesive bead extends perpendicular to the glass substrate 52 prior to application of a load), 67°, 57°, 46°, and 37° (with each of the preceding angles of under 90° representing a case where the edge 406 comprised a concave shape having a different radius of curvature such that the adhesive bead 66 extended at the same relative angle with respect to the glass substrate 52 and support structure 64 at the ends of the edge 406) were simulated. FIG. 7A depicts the results for when a unit shear load was applied to the adhesive bead 66 (FIG. 7A depicts both maximum normal stress in the top row and shear stress in the bottom row). FIG. 7B depicts the results for when unit tension load was applied to the adhesive bead 66 (FIG. 7B depicts both maximum normal stresses in the top row and shear stresses in the bottom row). As shown, for both loading cases, a decrease in $\Theta_1$ generally reduces the magnitude of the maximum stress predicted via the finite element model. Moreover, as shown in the top row in FIG. 7A, for example, when the angle $\Theta_1$ is less than 57°, the areas of the adhesive bead subjected to relatively high stresses is removed from the corner of the adhesive bead 66. That is, when under a shearing load, for example, the areas where the stresses are maximum are not at the corner of the adhesive bead and also removed from the contact area 402 (see FIG. 4). The maximum stresses generally occur within the body or bulk of the adhesive bead 66. Existing finite element models are generally capable of predicting stresses within the bodies of materials (rather than at bi-material interfaces). Accordingly, not only does the adhesive bead structure described herein lower maximum stresses (especially when the angle $\Theta_1$ is greater than or equal to 40° and less than or equal to 50°), but the structure also beneficially locates peak stresses in the body of the adhesive bead 66 rendering stress behavior more predictable, leading to more reliable part design.

As shown in FIGS. 7A and 7B, the concave example with the angle $\Theta_1$=46° exhibited the lowest magnitude stress for both the tension and shear load cases (in terms of both normal and shear stresses). It is worth noting that, while the shear loading case for this example exhibited relatively high shear stress values at the corners of the adhesive bead 66, the orders of the stress singularities are still reduced, as indicated by the relatively larger areas of the regions of relatively high stress. Such larger areas of large stress will render computational results less dependent on mesh size and the behavior of the resulting articles more predictable. The lower magnitude of the stresses will also tend to render the resultant articles more reliable than when the angle $\Theta_1$ is 90° or more (such as in straight edge or convex adhesive bead structures).

Experiments were conducted for the straight-edge design of the adhesive bead 66 (where the angle $\Theta_1$ is) 90° and failure often appeared at the contact area 402 (see FIG. 4) due to either defects on the surfaces of the glass or local variations in chemistry (e.g., of the adhesive bead). If cracks form at the interface or in the bulk of the adhesive, crack propagation behavior should be taken into account in order to assess part behavior of the glass article. Cracks can change the global responsive of a glass article to a particular load. The lower stresses at the contact area 402 provided by the concave adhesive beads described herein renders such crack formation less likely. The concave bead designs descried herein may render cohesive failure (in the bulk of the adhesive) more likely, which renders high strength variability due to interfacial variations less likely.

3D finite element analysis was also conducted. For the 3D case, the influence of the concave bead shape is similar to the 2D case described herein with respect to FIGS. 7A and 7B. For the straight-edge case, the adhesive bead 66 was modelled as a unit cube (1×1×1 mm³). For the concave case, the adhesive bead 66 was modelled as having four concave outer surfaces possessing radii of curvature such that the angle $\Theta_1$ was 45° for each outer surface.

Figure 8B:
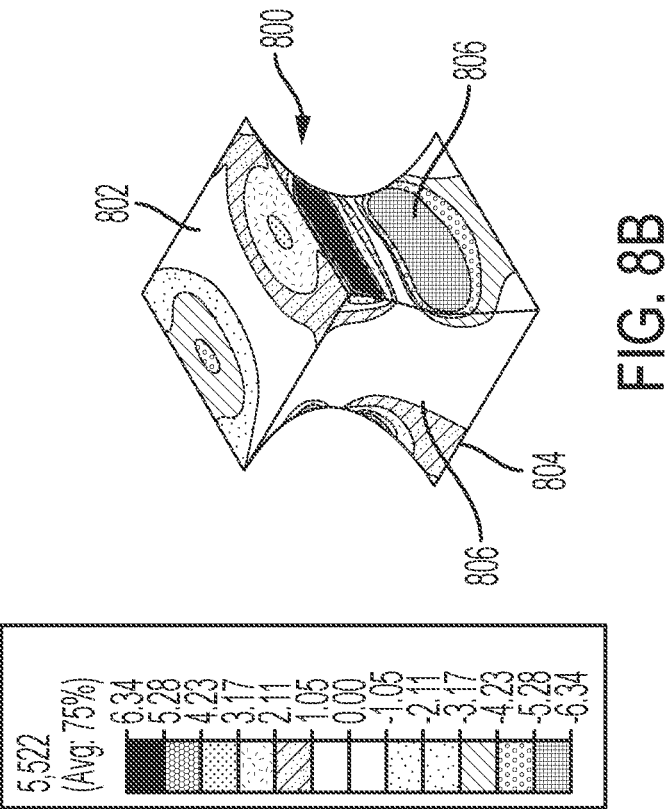
FIG. 8B depicts a simulated adhesive bead with a concave edge design when under shear stresses associated with an opening failure mode, according to one or more embodiments of the present disclosure.

FIGS. 8A-8D depict the 3D results for a shear loading case. As shown in FIG. 8B, the adhesive bead 800 modelled in this example comprised a concave shape, a top surface 802, a bottom surface 804, and a plurality of outer surfaces 806. The top surface 802 was bonded to the glass substrate (corresponding to the glass substrate 52 described herein with respect to FIGS. 2A-4) in the simulation, while the bottom surface 804 was bonded with the support structure (corresponding to the support structure 64 described herein with respect to FIGS. 2A-4). In this example, each of the plurality of outer surfaces 806 was simulated to have the same concave shape extending an entirety of the distance between the glass substrate and the support structure. Such an example represents a case where the incorporating glass article comprises a plurality of discrete and separate adhesive beads connecting the glass substrate and the support structure. Such a set of discrete adhesive beads may be dispensed along the bead path described herein with respect to FIG. 3 and extend along a peripheral portion of the glass substrate. Embodiments are also envisioned where the adhesive bead is a continuous strip of material dispensed along the bead path, in which case the adhesive bead would only comprise two outer surfaces.

Figure 8A:
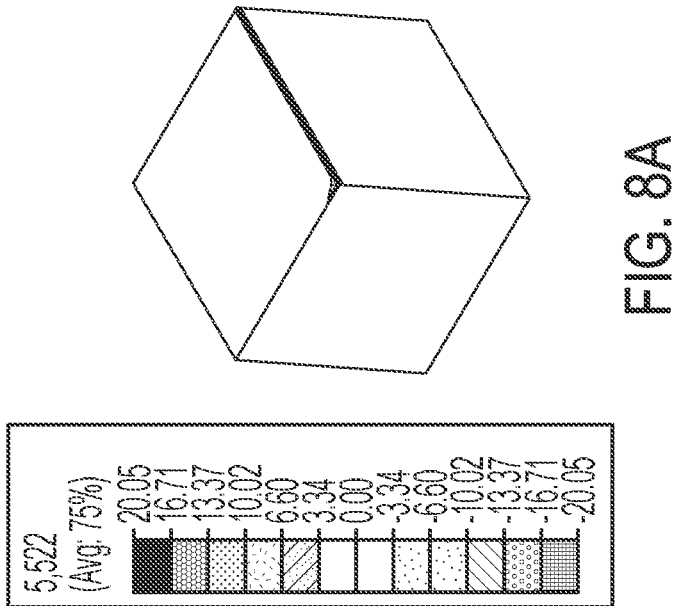
FIG. 8A depicts a simulated adhesive bead with a straight-edge design when under shear stresses associated with an opening failure mode, according to one or more embodiments of the present disclosure.
Figure 8D:
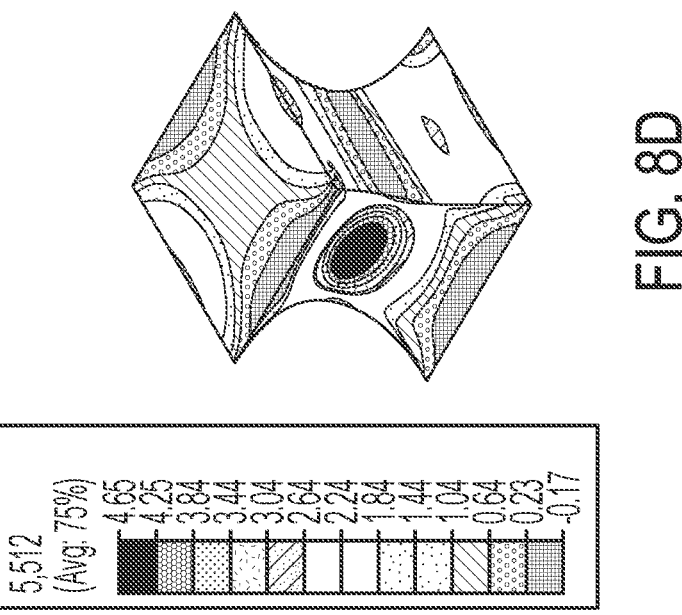
FIG. 8D depicts a simulated adhesive bead with a concave edge design when under shear stresses associated with a sliding failure mode, according to one or more embodiments of the present disclosure.
Figure 8C:
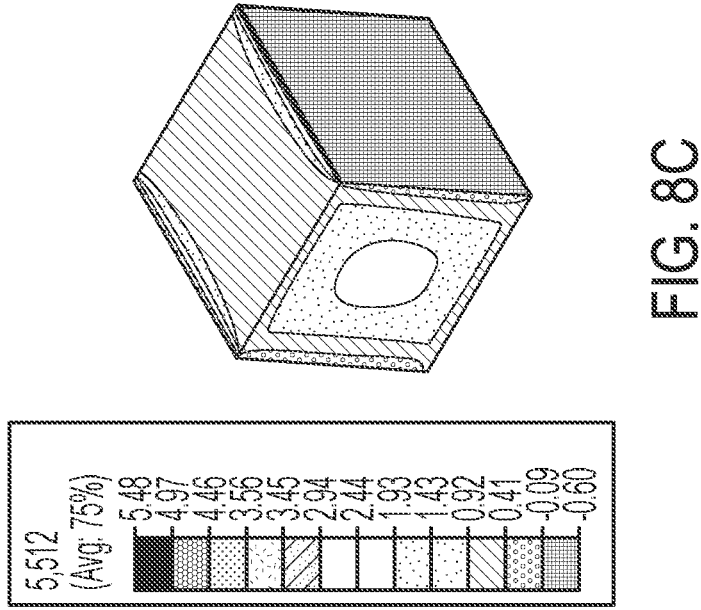
FIG. 8C depicts a simulated adhesive bead with a straight-edge design when under shear stresses associated with a sliding failure mode, according to one or more embodiments of the present disclosure.

In FIGS. 8A-8D, the top right corners of the depicted beads represents the outer edge of the glass-adhesive interface (corresponding to the edge 404 depicted in FIG. 4). FIG. 8A depicts the simulation results for the opening failure mode (interfacial detachment between the two materials in a direction perpendicular to the interface) at the interface for the straight-edge design. FIG. 8B depicts the simulation results for the opening failure mode at the interface for the concave design. FIG. 8C depicts the simulation results for the sliding failure mode (interfacial detachment between the two materials in a direction parallel to the interface at the interface) for the straight-edge design. FIG. 8D depicts the simulation results for the sliding failure mode at the interface for the concave design. As shown in FIGS. 8A-8B, the maximum mode 1 (opening) stress decreased by 68% for the concave case. As shown in FIGS. 8C and 8D, the maximum mode II (sliding) stress decreased by 15% for the concave shape.

Figure 9B:
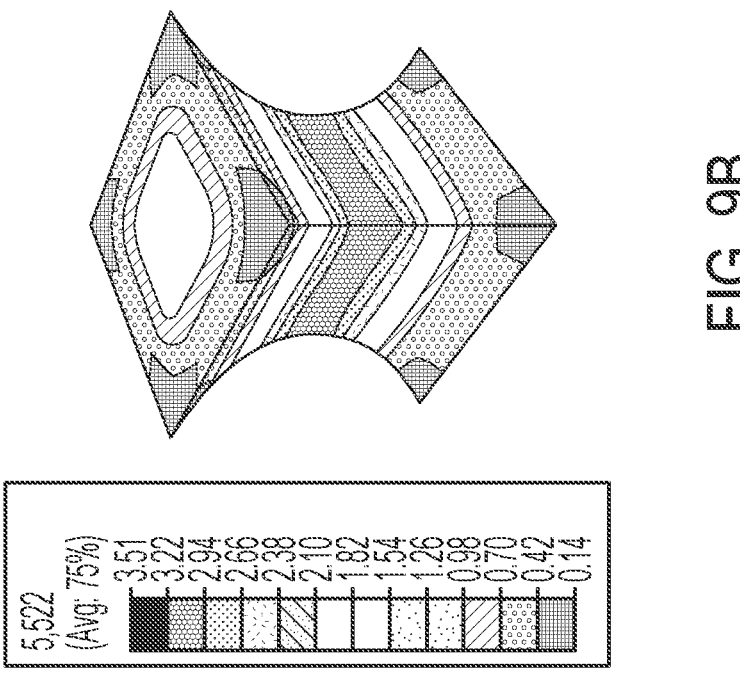
FIG. 9B depicts a simulated adhesive bead with a concave edge design when under tensile stresses associated with an opening failure mode, according to one or more embodiments of the present disclosure.
Figure 9A:
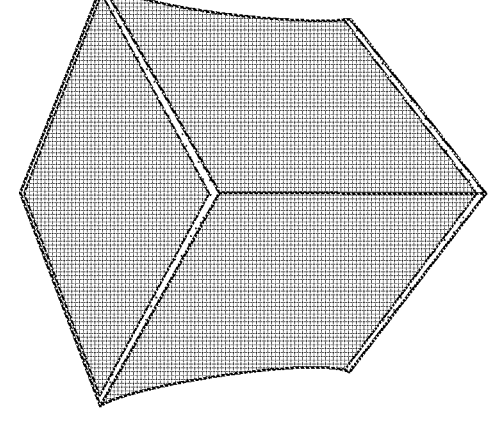
FIG. 9A depicts a simulated adhesive bead with a straight-edge design when under tensile stresses associated with an opening failure mode, according to one or more embodiments of the present disclosure.
Figure 9D:
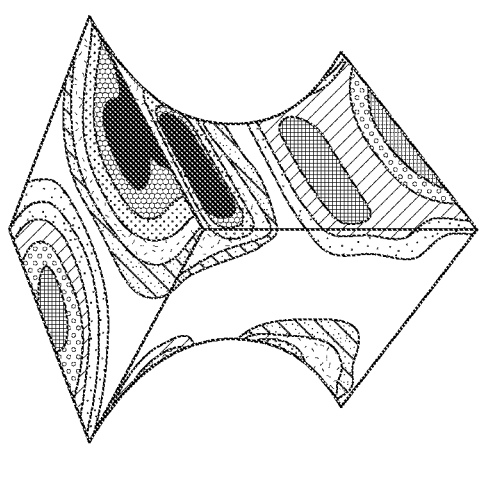
FIG. 9D depicts a simulated adhesive bead with a concave edge design when under tensile stresses associated with a sliding failure mode, according to one or more embodiments of the present disclosure.
Figure 9D:
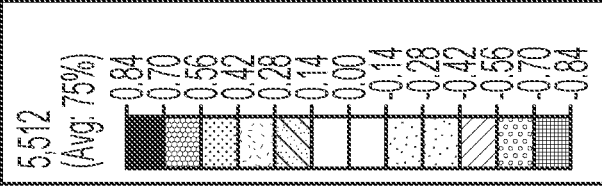
Figure 9C:
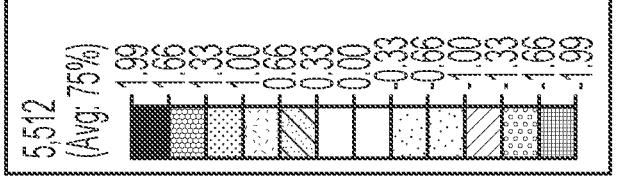
FIG. 9C depicts a simulated adhesive bead with a straight-edge design when under tensile stresses associated with a sliding failure mode, according to one or more embodiments of the present disclosure.

FIGS. 9A-9D depict the results for a tension loading case. FIG. 9A depicts the tensile loading results for the opening failure mode associated with the straight-edge case. FIG. 9B depicts the tensile loading results for the opening failure mode for the concave edge case. FIG. 9C depicts the tensile loading results for the sliding failure mode associated with the straight-edge case. FIG. 9D depicts the tensile loading results for the sliding failure mode for the concave edge case. As shown in FIGS. 9A and 9B the maximum stress in the opening failure mode (mode I) decreased by 58% as a result of the concave edge structure. As shown in FIGS. 9C and 9D, the maximum stress in the sliding failure mode (mode II) decreased by 58% as a result of the concave edge structure. For each of the loads and failure mode results depicted in FIGS. 8A-9D, the location of maximum stress was removed from the corner in the concave bead and instead in the bulk of the adhesive.

Figures 10A, 10B:
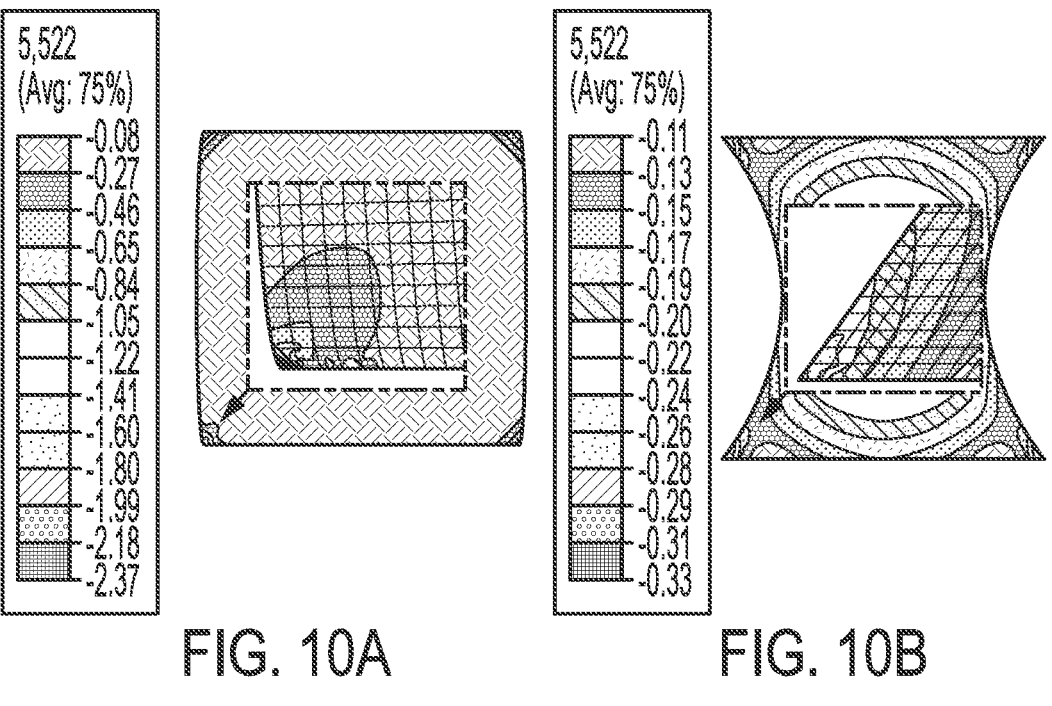
FIG. 10A depicts a simulated adhesive bead with a straight-edge design when under stresses induced by a coefficient of thermal expansion (CTE) mismatch between a glass substrate and a support structure, the stresses being associated with an opening failure mode, according to one or more embodiments of the present disclosure.
FIG. 10B depicts a simulated adhesive bead with a concave edge design when under stresses induced by a coefficient of thermal expansion (CTE) mismatch between a glass substrate and a support structure, the stresses being associated with an opening failure mode, according to one or more embodiments of the present disclosure.
Figures 10C, 10D:
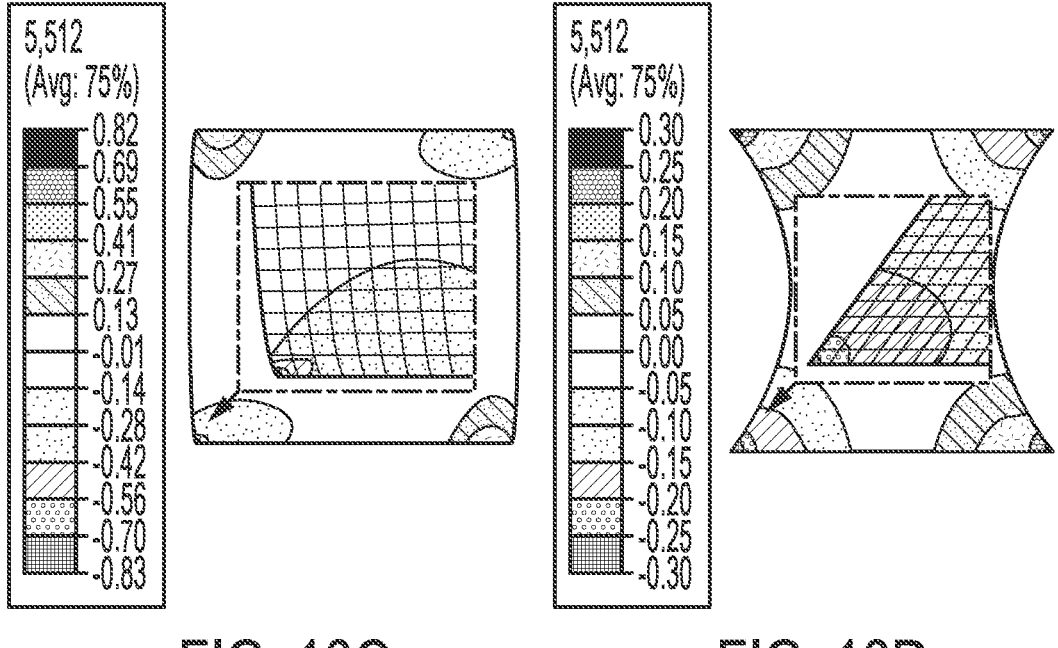
FIG. 10C depicts a simulated adhesive bead with a straight-edge design when under stresses induced by a coefficient of thermal expansion (CTE) mismatch between a glass substrate and a support structure, the stresses being associated with a sliding failure mode, according to one or more embodiments of the present disclosure.
FIG. 10D depicts a simulated adhesive bead with a concave edge design when under stresses induced by a coefficient of thermal expansion (CTE) mismatch between a glass substrate and a support structure, the stresses being associated with a sliding failure mode, according to one or more embodiments of the present disclosure.

A further 2D finite element analysis was conducted to determine the effects of the adhesive bead design described herein on coefficient of expansion ("CTE") mismatch induced stresses. The test was numerically applied in 2D by fixing the top surface of the glass substrate, disposed above the adhesive bead. A bottom surface of the adhesive bead was also fixed on an aluminum frame. Heating was imposed on the assembly from an initial temperature of 22° C. to a final temperature of 90° C. Due to relatively large CTE mismatches between the adhesive, glass, and aluminum (with each component having a CTE of 1.5E-4/° K, 7.9E-6/° K, and 2.1E-5/° K, respectively), the adhesive will be in a compressive state at the end of heating. The simulation results are depicted in FIGS. 10A-10D. FIG. 10A depicts the results for the opening failure mode for the straight-edge case. FIG. 10B depicts the results for the opening failure mode for the concave edge case (with $\Theta_1=45°$). FIG. 10C depicts the results for the sliding failure mode for the straight-edge case. FIG. 10D depicts the results for the sliding failure mode for the concave edge case. As shown in FIGS. 10A and 10C, the straight edge design shows a singularity at the corner. As shown in FIGS. 10B and 10D, the concave shape exhibits substantial decreases in maximum stresses (86% reduction in opening failure mode stress and 64% reduction in sliding failure mode stress). The concave case also reduces the singularity, with the regions of maximum stress at the corner being larger in size than for the straight-edge case. These results indicate that the concave adhesive bead designs described herein improve stress performance of various glass articles, when subjected to stresses from a number of different sources.

While the adhesive beads described with respect to the previous examples have been described has having a "concave" shape, it should be understood that adhesive beads having a wide variety of shapes are contemplated and within the scope of the present disclosure. In some embodiments, the outside surfaces of an adhesive bead (extending between the glass substrate and the support structure) are continuously-curved over entirety thereof (e.g., the outside surfaces of the adhesive bead may be concave and curved with a single radius of curvature, or comprise a variable radius of curvature, over an entirety of the distance between the glass substrate and the support structure). In other embodiments, the outer surfaces of the adhesive bead may not be curved over the entire distance between the glass substrate and the support structure. That is, in embodiments, portions of the outer surfaces of the adhesive bead may be planar in shape or even be convex. While the concave shape with continuous curvature may be preferred for ease of manufacture and localizing maximum stresses in the bulk of the adhesive bead, it has been found that limiting the magnitude of the stress singularity described herein is particularly beneficial. Accordingly, any adhesive bead structure that confines the angle $\Theta_1$ that the adhesive extends relative to the glass substrate and support structure at the adhesive interfaces to the ranges described herein could be used. As such, the adhesive shaping techniques described herein (e.g., the shaping surfaces of the shaping members or sacrificial materials described herein with respect to FIGS. 11A and 11B) may be tailored to provide any suitable shape for the adhesive bead.

Figure 11A:
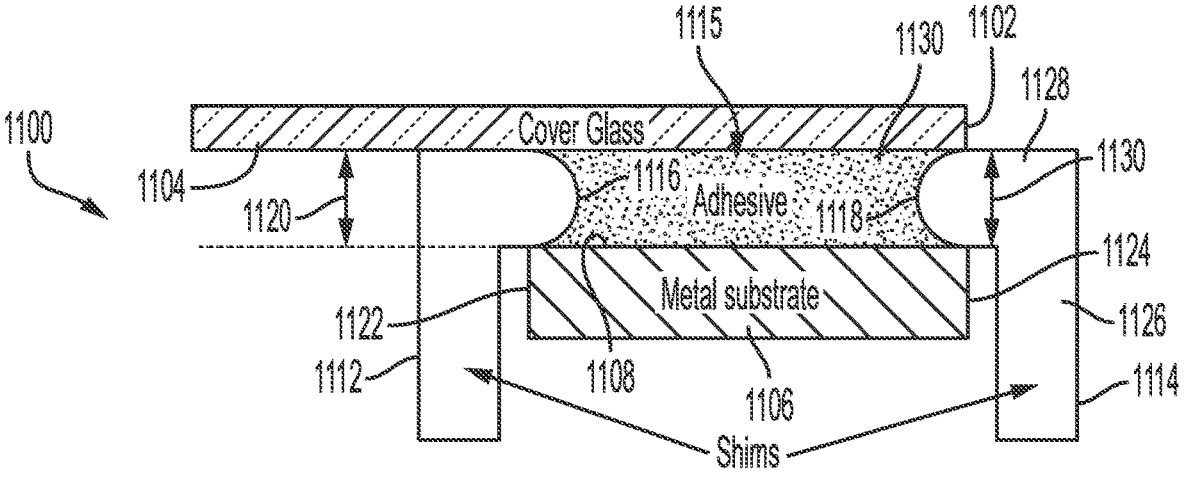
FIG. 11A schematically depicts a portion of a glass article during shaping of an adhesive bead with a plurality of shaping members, according to one or more embodiments of the present disclosure.

FIG. 11A schematically depicts a portion of a glass article 1100 while an adhesive bead 1110 thereof is curing, according to an example embodiment of the present disclosure. For example, the glass article 1100 may correspond to the glass article 50 described herein with respect to FIGS. 2A-10B. The glass article 1100 is depicted to comprise a glass substrate 1102 with a major surface 1104, a support structure 1106 with a support surface 1108, and the adhesive bead 1110. FIG. 11A depicts the glass article 1100 at a point in time when the adhesive bead 1110 is in contact with both the glass substrate 1102 and the support structure 1106 and prior to when the adhesive is fully cured. When in such a state, the pre-cured adhesive making up the adhesive bead 1110 is in a malleable state, and so is capable of being shaped to possess angles at the interfaces with the glass substrate 1102 and the support structure 1106 lying withing the ranges described herein with respect to the angle $\Theta_1$ depicted in FIG. 4.

As shown in FIG. 11A, when the adhesive bead 1110 is in an uncured or partially cured state, the adhesive bead 1110 is brought into contact with a plurality of shaping members 1112 and 1114. In embodiments, the plurality of shaping members 1112 and 1114 are movable relative to the glass substrate 1102 and support structure 1106 (e.g., by hand, via attachment to a mechanical assembly containing a suitable actuator) so that they can be arranged to form an adhesive shaping cavity 1115 having a desired positioning on the glass substrate 1102. External boundaries of the adhesive shaping cavity 1115 may be delineated by shaping surfaces 1116 and 1118 of the plurality of shaping members 1112 and 1114. In embodiments, the plurality of shaping members 1112 and 1114 are disposed to be in contact with the glass substrate 1102 or support structure 1106 prior to deposition of the adhesive. As such, in embodiments, the adhesive is disposed into the adhesive shaping cavity 1115 defined at least in part by the plurality of shaping members 1112 and 1114.

In embodiments, the plurality of shaping members 1112 and 1114 are brought into contact with the adhesive bead 1110 after the adhesive is dispensed on one of the glass substrate 1102 and the support structure 1106. In an example, the adhesive bead 1110 may be disposed on the glass substrate 1102 when the glass substrate 1102 is cold-formed via application of a suitable force thereto (e.g., via a vacuum chuck or clamp). After deposition, but prior to complete curing of the adhesive bead 1110, the plurality of shaping members 1112 and 1114 can be brought into contact with the glass substrate 1102 and adhesive bead 1110 so as to deform the adhesive bead 1110 such that outer surfaces thereof take the shapes of the shaping surfaces 1116 and 1118. In embodiments, prior to when the adhesive is completely curved (e.g., prior to the plurality of shaping members 1112 and 1114 being brought into contact with the adhesive bead 1110), the support structure 1106 is brought a distance 1120 away from the glass substrate 1102. The distance 1120 may correspond to a desired height of the adhesive bead 1110 after curing (e.g., measured in a direction perpendicular to the major surface 1104 of the glass substrate 1102). In embodiments, the support structure 1106 can be positioned the distance 1120 away from the glass substrate 1102 after the plurality of shaping members 1112 and 1114 are brought into contact with the adhesive bead 1110.

The number of shaping members in the plurality of shaping members 1112 and 1114 may vary depending on a desired peripheral shape of the adhesive bead 1110. In the depicted embodiment, for example, the plurality of shaping members 1112 and 1114 comprises an inner shaping member 1112 and an outer shaping member 1114. The inner shaping member 1112 may be disposed proximal an inner edge 1122 of the support structure 1106. The outer shaping member 1114 may be disposed proximal an outer edge 1124 of the support structure 1106. In embodiments, the inner shaping member 1112 and the outer shaping member 1114 correspond in shape to the support structure 1106. For example, in embodiments, the support structure 1106 is a frame attached to a peripheral portion of the major surface 1104 of the glass substrate 1102, and the inner shaping member 1112 and the outer shaping member 1114 are also frame shaped. The inner shaping member 1112 and the outer shaping member 1114 may be formed of a plurality of sections that are movable independently of one another to facilitate forming such a shape. The particular shape of the adhesive shaping cavity 1115 may vary depending on the implementation, and the shape and arrangement of the plurality of shaping members 1112 and 1114 may vary.

In embodiments, more than two shaping members may contact the adhesive bead 1110 when forming the adhesive shaping cavity 1115. In embodiments, a number of shaping members that contacts the adhesive bead 1110 corresponds to a number of outer surfaces of the adhesive bead 1110. For example, to form the adhesive bead structure described herein with respect to FIGS. 8B and 8D, four shaping members may contact the adhesive bead 1110. In embodiments, a plurality of sets of shaping members are brought into contact with a plurality of separate adhesive beads disposed on one of the glass substrate 1102 and support structure 1106 to form a plurality of separate adhesive shaping cavities. Any suitable number of shaping members may be used depending on the pattern of adhesive that is dispensed between the support structure 1106 and the glass substrate 1102.

Each of the plurality of shaping members 1112 and 1114 may have any suitable structure depending on a desired shape of the adhesive shaping cavity 1115 and the shape of the support structure 1106. In the depicted embodiment, for example, the outer shaping member 1114 comprises an arm 1126 and a shaping extension 1128 that extends at an angle relative to the arm 1126. The shaping extension 1128 may have a maximum dimension 1130 corresponding to the distance 1120 that the glass substrate 1102 is disposed relative to the support structure 1106 when the adhesive is cured. The shaping extension 1128 comprises the shaping surface 1118 and is generally configured to be inserted between the glass substrate 1102 and the support structure 1106 to form the adhesive shaping cavity 1115. The arm 1126 extending at an angle relative to the shaping extension 1128 beneficially aids in manipulating the positioning of the outer shaping member 1114 relative to the glass substrate 1102. The inner shaping member 1112 may have a structure that is similar to the outer shaping member 1114.

In embodiments, the plurality of shaping members 1112 and 1114 (or at least portions thereof that contact the glass substrate 1102, support structure 1106, and adhesive bead 1110) are formed of a material that is selected to not adhere to the glass substrate 1102, support structure 1106, and adhesive bead 1110 during curing of the adhesive. For example, the plurality of shaping members 1112 and 1114 may not bond to the adhesive bead 1110. In embodiments, the plurality of shaping members 1112 and 1114 are formed of a suitable metal material that does not bond with the adhesive. A suitable non-stick coating (e.g., polytetrafluoroethylene shims or anodized aluminum) may be applied to the plurality of shaping members 1112 and 1114 to reduce the probability of bonding. Such a structure beneficially facilitates the adhesive bead 1110 being shaped to conform with the shaping surfaces 1116 and 1118 and removal of the plurality of shaping members 1112 and 1114 without changing the shape of the adhesive bead 1110, or damaging the glass substrate 1002 or support structure 1006.

Figure 11B:
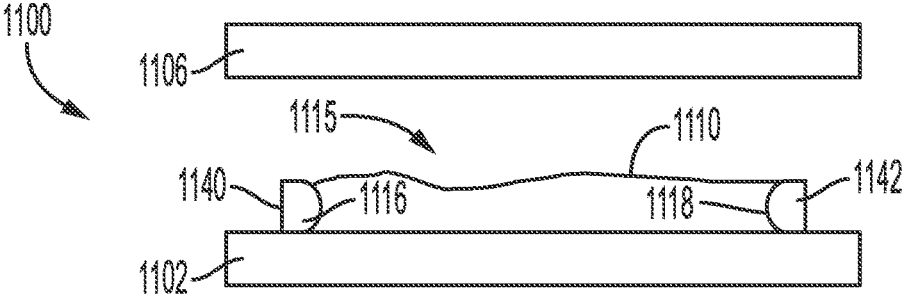
FIG. 11B schematically depicts a portion of a glass article during shaping of an adhesive bead with a plurality of sacrificial shaping members, according to one or more embodiments of the present disclosure.

FIG. 11B depicts the glass article 1100 being formed using an alternative set of shaping members. As shown in FIG. 11B, a plurality of sacrificial shaping members 1140 and 1142 are used to form the shaping surfaces 1116 and 1118 described herein with respect to FIG. 11B. The plurality of sacrificial shaping members 1140 and 1142 may be formed and/or disposed on the glass substrate 1102 prior to deposition of the adhesive bead 1110 on the glass substrate 1102. The plurality of sacrificial shaping members 1140 and 1142 may be a suitable material that can be removed from the glass substrate 1102 after the adhesive of the adhesive bead 1110 is fully cured, without damaging the adhesive bead 1110, the glass substrate 1102, and the support structure 1106. In embodiments, the sacrificial shaping members 1140 and 1142 are formed of a suitable wax that can maintain a shape during curing of the adhesive and then be melted by heating to a temperature of less than or equal to 70° C. (e.g., greater than or equal to 46° C. and less than or equal to 68° C.) to avoid changing the structure of the adhesive bead 1110. Such wax structures may be formed by a suitable process (e.g., molding, additive manufacturing) on the glass substrate 1102 prior to deposition of the adhesive in any suitable arrangement depending on the desired structure for the adhesive bead. Prior to curing of the adhesive bead, the support structure 1106 may be brought into contact with the plurality of sacrificial shaping members 1140 and 1142 to complete the adhesive shaping cavity 1115. Any sacrificial material that can be removed by a process that does not damage the adhesive bead 1110 after curing of the adhesive may be used. In embodiments, for example, the plurality of sacrificial shaping members 1140 and 1142 may be magnetically held in place during curing of the adhesive and subsequently and removed by switching off or removing the magnet. Any suitable temporary shaping member structure may be used. In embodiments, the plurality of sacrificial shaping members 1140 and 1142 may be formed on the support structure 1106 and the glass substrate 1102 may subsequently be brought into contact with the support structure 1106.

In embodiments, the adhesive may be dispensed into the adhesive shaping cavity through at least one of the plurality of shaping members. For example, one of the plurality of shaping members may include a channel extending therethrough and the adhesive may be dispensed after the adhesive shaping cavity 1115 comprises a closed cavity (except the end of the channel).

Figure 12:
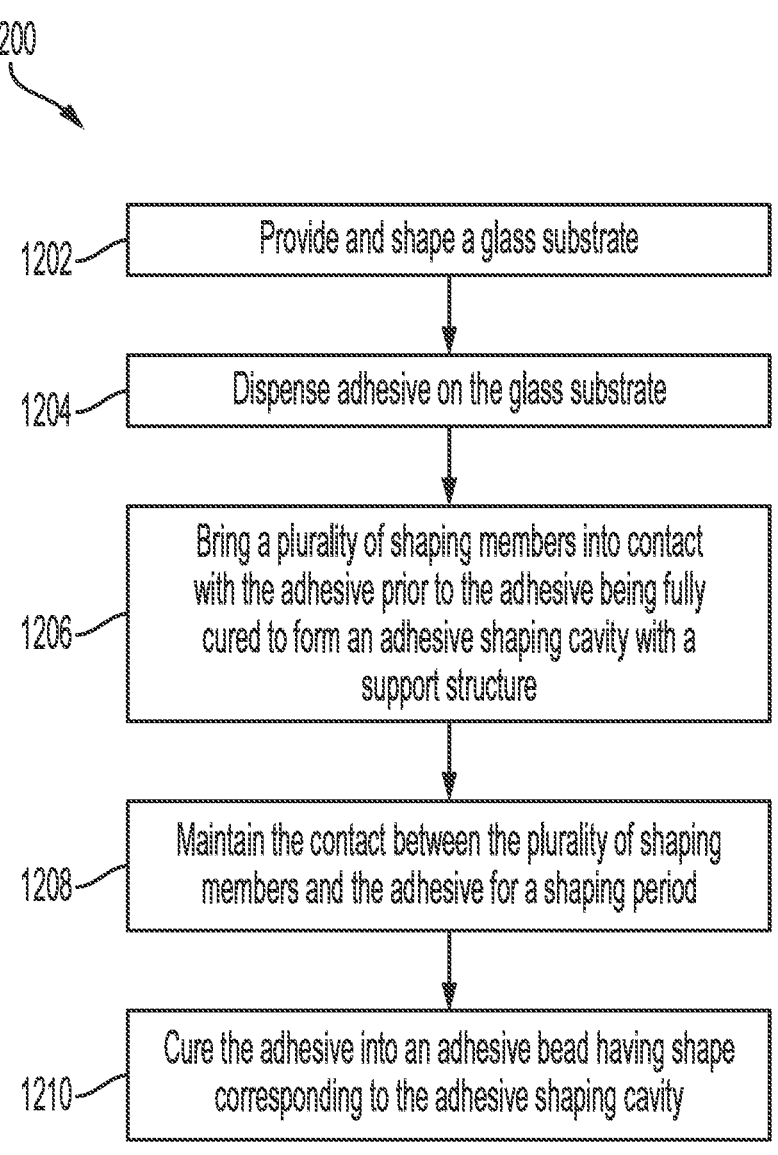
FIG. 12 depicts a flow diagram of a method of attaching a glass substrate to a support structure using an adhesive bead, according to one or more embodiments of the present disclosure.

FIG. 12 depicts a flow diagram of a method 1200 of attaching a glass substrate to a support structure using an adhesive bead structure, according to an example embodiment of the present disclosure. The method 1200 may be used, for example, to form the glass article 50 described herein with respect to FIGS. 2A and 2B or in any other configuration. Reference will be made to various components described herein with respect to FIGS. 2A-4 to aid in the description of the method. At block 1202, the glass substrate 52 is provided and shaped. The glass substrate 52 may be commercially purchased or formed using any suitable glass-forming technique (e.g., down-draw technique, float-forming technique). In embodiments, the glass substrate 52 is cold-formed and shaping may include bending the glass substrate 52 to possess a desired curvature. Such bending can include application of a bending force to the glass substrate 52 to bend the glass substrate 52 into conformity with a support surface. In embodiments, such bending occurs via the chuck 68 depicted in FIG. 3, though any suitable cold-forming technique can be used.

At block 1204, adhesive is dispensed on the glass substrate 52. Any suitable adhesive may be used (e.g., structural adhesive, optically clear adhesive, pressure sensitive adhesive, UV-curable adhesive). The adhesive may include a suitable viscosity to facilitate dispensing by a suitable method. The adhesive may be dispensed, for example, by an applicator gun or the nozzle 71 depicted in FIG. 3 along a bead path. In embodiments, the adhesive is dispensed in a continuous strip. In embodiments, the adhesive is dispensed in a plurality of discrete beads. In embodiments, rather than being initially dispensed on the glass substrate 52, the adhesive is dispensed on the support structure 64.

At block 1206, a plurality of shaping members is brought into contact with the adhesive prior to the adhesive being fully cured to form an adhesive shaping cavity with the support structure. In embodiments, the plurality of shaping members is the plurality of shaping members 1112 and 1114 described herein with respect to FIG. 11A and are brought into contact with the adhesive via movement thereof by a suitable mechanism (e.g., by hand or a suitable actuator assembly). In embodiments, the plurality of shaping members is the plurality of sacrificial shaping members 1240 and 1242 described herein with respect to FIG. 11B and are brought into contact with the adhesive by being present on the glass substrate 52 (or support structure 64) when the adhesive is dispensed. The support structure 64 may be moved relative to the glass substrate 52 into contact with the shaping members to enclose the adhesive shaping cavity.

At block 1208, the contact between the adhesive and the plurality of shaping members is maintained for a shaping period. In embodiments (such as when the plurality of sacrificial shaping members 1140 and 1142 are used), the contact is maintained until the adhesive is fully cured to prevent the removal of the shaping members from changing the shape of the adhesive. In embodiments, the contact is maintained at least until the adhesive is capable of maintaining a shape of shaping surfaces of the shaping members without the contact. Such a minimum period may be determined on the curing conditions and curing rate of the adhesive. The contact is maintained during curing of the adhesive at curing conditions that are determined by the adhesive used (e.g., under exposure to radiation, at a particular temperature). At 1210, the adhesive is completely cured to form the adhesive bead 66, such that the angles at the corners of the adhesive bead 66 at the glass-adhesive interface and the interface between the support structure and the adhesive have values lying in any of the ranges provided herein for the angle $\Theta_1$ depicted in FIG. 4.

Glass Materials

Figure 13:
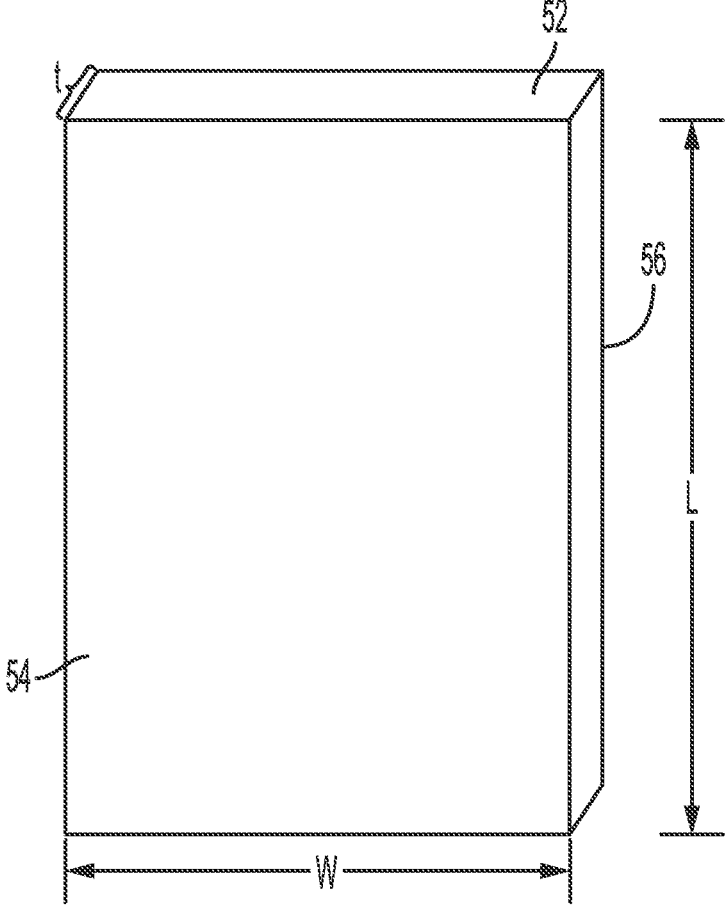
FIG. 13 schematically depicts a glass substrate, according to one or more embodiments of the present disclosure.

Referring to FIG. 13, in embodiments the glass substrate 52 has a thickness t that is substantially constant over the width and length of the glass substrate 52 and is defined as a distance between the first major surface 54 and the second major surface 56. In various embodiments, T may refer to an average thickness or a maximum thickness of the glass substrate 52. In addition, the glass substrate 52 includes a width W defined as a first maximum dimension of one of the first or second major surfaces 54, 56 orthogonal to the thickness t, and a length L defined as a second maximum dimension of one of the first or second major surfaces 54, 56 orthogonal to both the thickness and the width. In other embodiments, W and L may be the average width and the average length of the glass substrate 52, respectively, and in other embodiments, W and L may be the maximum width and the maximum length of the glass substrate 52, respectively (e.g., for a glass substrate having a variable width or length).

In various embodiments, thickness t is 2 mm or less. In particular, the thickness t is from 0.30 mm to 2.0 mm. For example, thickness t may be in a range from about 0.30 mm to about 2.0 mm, from about 0.40 mm to about 2.0 mm, from about 0.50 mm to about 2.0 mm, from about 0.60 mm to about 2.0 mm, from about 0.70 mm to about 2.0 mm, from about 0.80 mm to about 2.0 mm, from about 0.90 mm to about 2.0 mm, from about 1.0 mm to about 2.0 mm, from about 1.1 mm to about 2.0 mm, from about 1.2 mm to about 2.0 mm, from about 1.3 mm to about 2.0 mm, from about 1.4 mm to about 2.0 mm, from about 1.5 mm to about 2.0 mm, from about 0.30 mm to about 1.9 mm, from about 0.30 mm to about 1.8 mm, from about 0.30 mm to about 1.7 mm, from about 0.30 mm to about 1.6 mm, from about 0.30 mm to about 1.5 mm, from about 0.30 mm to about 1.4 mm, from about 0.30 mm to about 1.4 mm, from about 0.30 mm to about 1.3 mm, from about 0.30 mm to about 1.2 mm, from about 0.30 mm to about 1.1 mm, from about 0.30 mm to about 1.0 mm, from about 0.30 mm to about 0.90 mm, from about 0.30 mm to about 0.80 mm, from about 0.30 mm to about 0.70 mm, from about 0.30 mm to about 0.60 mm, or from about 0.30 mm to about 0.40 mm. In other embodiments, the t falls within any one of the exact numerical ranges set forth in this paragraph.

In various embodiments, width W is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W falls within any one of the exact numerical ranges set forth in this paragraph.

In various embodiments, length L is in a range from about 5 cm to about 2500 cm, from about 5 cm to about 2000 cm, from about 4 to about 1500 cm, from about 50 cm to about 1500 cm, from about 100 cm to about 1500 cm, from about 150 cm to about 1500 cm, from about 200 cm to about 1500 cm, from about 250 cm to about 1500 cm, from about 300 cm to about 1500 cm, from about 350 cm to about 1500 cm, from about 400 cm to about 1500 cm, from about 450 cm to about 1500 cm, from about 500 cm to about 1500 cm, from about 550 cm to about 1500 cm, from about 600 cm to about 1500 cm, from about 650 cm to about 1500 cm, from about 650 cm to about 1500 cm, from about 700 cm to about 1500 cm, from about 750 cm to about 1500 cm, from about 800 cm to about 1500 cm, from about 850 cm to about 1500 cm, from about 900 cm to about 1500 cm, from about 950 cm to about 1500 cm, from about 1000 cm to about 1500 cm, from about 1050 cm to about 1500 cm, from about 1100 cm to about 1500 cm, from about 1150 cm to about 1500 cm, from about 1200 cm to about 1500 cm, from about 1250 cm to about 1500 cm, from about 1300 cm to about 1500 cm, from about 1350 cm to about 1500 cm, from about 1400 cm to about 1500 cm, or from about 1450 cm to about 1500 cm. In other embodiments, L falls within any one of the exact numerical ranges set forth in this paragraph.

In embodiments, the glass substrate 52, may be formed from any suitable glass composition comprising soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may comprise $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition comprises $Al_2O_3$ in an amount greater than about 4 mol %, or greater than about 5 mol %. In one or more embodiments, the glass composition comprises $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, glass layer(s) herein are described as an aluminosilicate glass article or comprising an aluminosilicate glass composition. In such embodiments, the glass composition or article formed therefrom comprises SiO2 and $Al_2O_3$ and is not a soda lime silicate glass. In this regard, the glass composition or article formed therefrom comprises $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and comprising 2 mol %, 1.5 mol %, 1 mol %, or 0.5 mol %. In one or more embodiments, the glass composition is substantially free of $P_2O_5$.

In one or more embodiments, the glass composition may comprise a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition comprises a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may comprise the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition comprises $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition comprises less than about 4 mol % $K_2O$, less than about 3 mol % $K_2O$, or less than about 1 mol % $K_2O$. In some instances, the glass composition may comprise $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may comprise a total amount of RO (which is the total amount of alkaline earth metal oxide such as CaO, MgO, BaO, ZnO and SrO) in a range from about 0 mol % to about 2 mol %. In some embodiments, the glass composition comprises a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition comprises CaO in an amount less than about 1 mol %, less than about 0.8 mol %, or less than about 0.5 mol %. In one or more embodiments, the glass composition is substantially free of CaO. In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may comprise an oxide that imparts a color or tint to the glass articles. In some embodiments, the glass composition comprises an oxide that prevents discoloration of the glass article when the glass article is exposed to ultraviolet radiation. Examples of such oxides comprise, without limitation oxides of: Ti, V, Cr, Mn, Fe, Co, Ni, Cu, Ce, W, and Mo.

In one or more embodiments, the glass composition comprises Fe expressed as $Fe_2O_3$, wherein Fe is present in an amount up to (and comprising) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition comprises $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition comprises $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1. 5 mol % to about 6 mol %. Optionally, $SnO_2$ may be comprised in the amounts otherwise disclosed herein.

Strengthened Glass Properties

In one or more embodiments, the glass substrate 52 discussed herein may be formed from a strengthened glass sheet or article. In one or more embodiments, the glass articles used to form the layer(s) of the decorated glass structures discussed herein may be strengthened to comprise compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, the glass articles used to form the layer(s) of the decorated glass structures discussed herein may be strengthened mechanically by utilizing a mismatch of the coefficient of thermal expansion between portions of the glass to create a compressive stress region and a central region exhibiting a tensile stress. In some embodiments, the glass article may be strengthened thermally by heating the glass to a temperature above the glass transition point and then rapidly quenching.

In one or more embodiments, the glass articles used to form the layer(s) of the decorated glass structures discussed herein may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the glass article generate a stress.

Ion exchange processes are typically carried out by immersing a glass article in a molten salt bath (or two or more molten salt baths) containing the larger ions to be exchanged with the smaller ions in the glass article. It should be noted that aqueous salt baths may also be utilized. In addition, the composition of the bath(s) may comprise more than one type of larger ion (e.g., Na+ and K+) or a single larger ion. It will be appreciated by those skilled in the art that parameters for the ion exchange process, comprising, but not limited to, bath composition and temperature, immersion time, the number of immersions of the glass article in a salt bath (or baths), use of multiple salt baths, additional steps such as annealing, washing, and the like, are generally determined by the composition of the glass layer(s) of a decorated glass structure (comprising the structure of the article and any crystalline phases present) and the desired DOC and CS of the glass layer(s) of a decorated glass structure that results from strengthening.

Exemplary molten bath composition may comprise nitrates, sulfates, and chlorides of the larger alkali metal ion. Typical nitrates comprise $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on the glass thickness, bath temperature and glass (or monovalent ion) diffusivity. However, temperatures and immersion times different from those described above may also be used.

In one or more embodiments, the glass articles used to form the layer(s) of the decorated glass may be immersed in a molten salt bath of 100% $NaNO_3$, 100% $KNO_3$, or a combination of $NaNO_3$ and $KNO_3$ having a temperature from about 370° C. to about 480° C. In some embodiments, the glass layer(s) of a decorated glass may be immersed in a molten mixed salt bath comprising from about 5% to about 90% $KNO_3$ and from about 10% to about 95% $NaNO_3$. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass articles used to form the layer(s) of the decorated glass structures may be immersed in a molten, mixed salt bath comprising $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass layer(s) of a decorated glass structure. The spike may result in a greater surface CS value. This spike can be achieved by single bath or multiple baths, with the bath(s) having a single composition or mixed composition, due to the unique properties of the glass compositions used in the glass layer(s) of a decorated glass structure described herein.

In one or more embodiments, where more than one monovalent ion is exchanged into the glass articles used to form the layer(s) of the decorated glass structures, the different monovalent ions may exchange to different depths within the glass layer (and generate different magnitudes stresses within the glass article at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four-point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass article. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from GlasStress Ltd., located in Tallinn Estonia), depending on the strengthening method and conditions. When the glass article is chemically strengthened by an ion exchange treatment, FSM or SCALP may be used depending on which ion is exchanged into the glass article. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Central tension or CT is the maximum tensile stress and is measured by SCALP.

In one or more embodiments, the glass articles used to form the layer(s) of the decorated glass structures maybe strengthened to exhibit a DOC that is described a fraction of the thickness t of the glass article (as described herein). For example, in one or more embodiments, the DOC may be equal to or greater than about 0.05 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, The DOC may be in a range from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOC may be about 20 μm or less. In one or more embodiments, the DOC may be about 40 μm or greater (e.g., from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 40 μm to about 290 μm, from about 40 μm to about 280 μm, from about 40 μm to about 260 μm, from about 40 μm to about 250 μm, from about 40 μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40

μm to about 120 μm, from about 40 μm to about 110 μm, or from about 40 μm to about 100 μm.

In one or more embodiments, the glass articles used to form the layer(s) of the decorated glass structures may have a CS (which may be found at the surface or a depth within the glass article) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the glass articles used to form the layer(s) of the decorated glass structures may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A glass article, comprising:
   a support structure comprising a support surface;
   a glass substrate comprising a first major surface and a second major surface, the second major surface being opposite to the first major surface; and
   an adhesive bead disposed between the support surface and the second major surface,
   wherein:
       the adhesive bead comprises a plurality of outer surfaces extending between the support structure and the glass substrate,
       the plurality of outer surfaces extends at first angles relative to the second major surface at first edges thereof that are most proximate to the glass substrate, and
       each of the first angles is greater than or equal to 35° and less than or equal to 60°.

2. The glass article of claim 1, wherein the plurality of outer surfaces extends at second angles relative to the support surface at second edges thereof that are most proximate to the support structure.

3. The glass article of claim 2, wherein the first angles equal the second angles for each of the plurality of outer surfaces.

4. The glass article of claim 1, wherein each of the first angles is greater than or equal to 40° and less than or equal to 50°.

5. The glass article of claim 1, wherein each of the first angles is greater than or equal to 42° and less than or equal to 48°.

6. The glass article of claim 1, wherein each of the first angles is greater than or equal to 44° and less than or equal to 46°.

7. The glass article of claim 1, wherein the support surface is curved and the adhesive bead maintains the glass substrate in a curved configuration on the support surface when the glass substrate is cold-formed.

8. The glass article of claim 7, wherein:

as a result of the glass substrate being cold-formed, the adhesive bead is maintained in a state of tensile stress, a position in the adhesive bead where the tensile stress comprises a maximum magnitude is displaced from an interface between the adhesive bead and the glass substrate and to the bulk of the adhesive bead.

9. The glass article of claim 1, wherein the adhesive bead continuously extends around a perimeter of the glass substrate between the glass substrate and the support structure.

10. The glass article of claim 1, wherein the glass article comprises a plurality of adhesive beads disposed along a bead path between the glass substrate and the support structure, each of the plurality of adhesive beads comprising a plurality of outer surfaces that extend at first angles relative to the second major surface that are greater than or equal to 35° and less than or equal to 60°.

11. The glass article of claim 1, wherein the plurality of outer surfaces of the adhesive bead is concave such that the adhesive bead comprises a minimum cross-sectional dimension between the glass substrate and the support structure.

12. The glass article of claim 11, wherein each of the plurality of outer surfaces of the adhesive bead is continuously curved an entirety of a distance between the glass substrate and the support structure.

13. The glass article of claim 1, wherein the adhesive bead comprises an elastic modulus in the cured state of 0.1 MPa to 300 MPa.

14. A glass article, comprising:

a support structure comprising a curved support surface that is curved at a radius of curvature that is greater than or equal to 75 mm and less than or equal to 10,000 mm;

a glass substrate comprising a first major surface and a second major surface, the second major surface being opposite to the first major surface; and an adhesive bead disposed between the curved support surface and the second major surface and retaining the glass substrate in a curved shape on the curved support surface, wherein:

the glass substrate is cold-formed such that a stress is present in the adhesive bead, the adhesive bead comprises a plurality of outer surfaces extending between the support structure and the glass substrate, the plurality of outer surfaces extends at first angles relative to the second major surface at first edges thereof that are most proximate to the glass substrate, and each of the first angles is greater than or equal to 35° and less than or equal to 60° such that a position in the adhesive bead where the stress is at a maximum value is displaced from an interface between the glass substrate and the adhesive bead.

15. The glass article of claim 14, wherein the plurality of outer surfaces extends at second angles relative to the support surface at second edges thereof that are most proximate to the support structure.

16. The glass article of claim 15, wherein the first angles equal the second angles for each of the plurality of outer surfaces.

17. The glass article of claim 14, wherein each of the first angles is greater than or equal to 40° and less than or equal to 50°.

18. The glass article of claim 14, wherein each of the first angles is greater than or equal to 44° and less than or equal to 46°.

19. The glass article of claim 14, wherein the adhesive bead continuously extends around a perimeter of the glass substrate between the glass substrate and the support structure.

20. The glass article of claim 14, wherein the glass article comprises a plurality of adhesive beads disposed along a bead path between the glass substrate and the support structure, each of the plurality of adhesive beads comprising a plurality of outer surfaces that extends at first angles relative to the second major surface that are greater than or equal to 35° and less than or equal to 60°.

21. The glass article of claim 14, wherein the plurality of outer surfaces of the adhesive bead is concave such that the adhesive bead comprises a minimum cross-sectional dimension between the glass substrate and the support structure.

22. The glass article of claim 14, wherein: the adhesive bead comprises an elastic modulus in the cured state of 0.1 MPa to 300 MPa, and the support structure is constructed of one of aluminum and stainless steel.

* * * * *